INVENTOR.
Karl Gustav Ahlén
BY James C Markle
His attorney

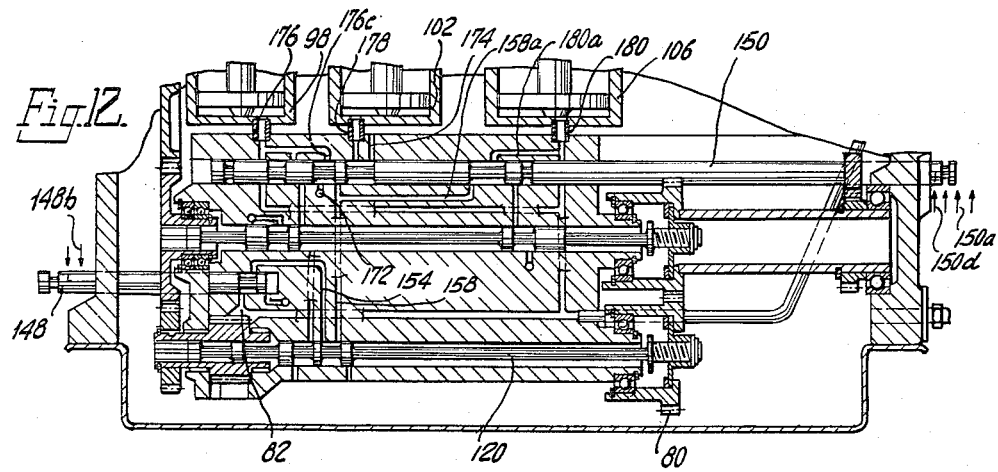
Fig. 12.
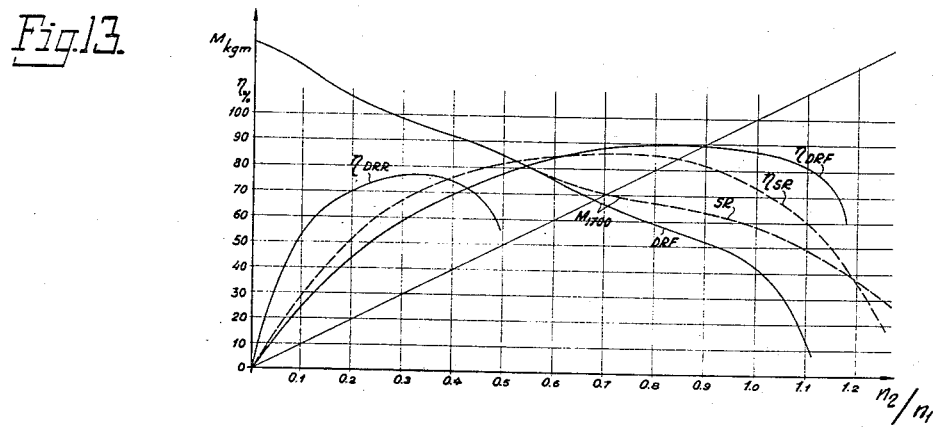
Fig. 13.
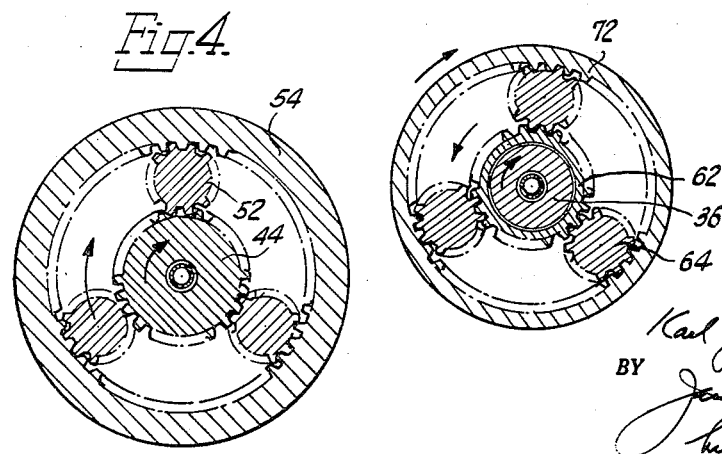
Fig. 4.
Fig. 5.

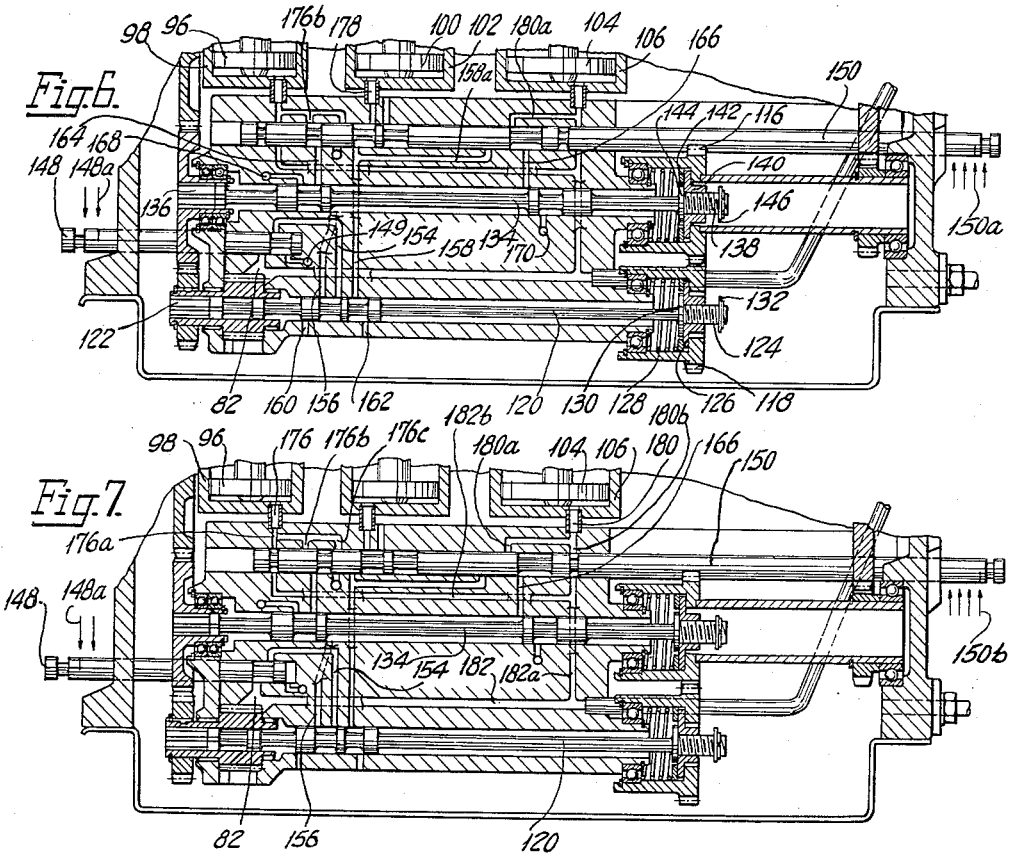
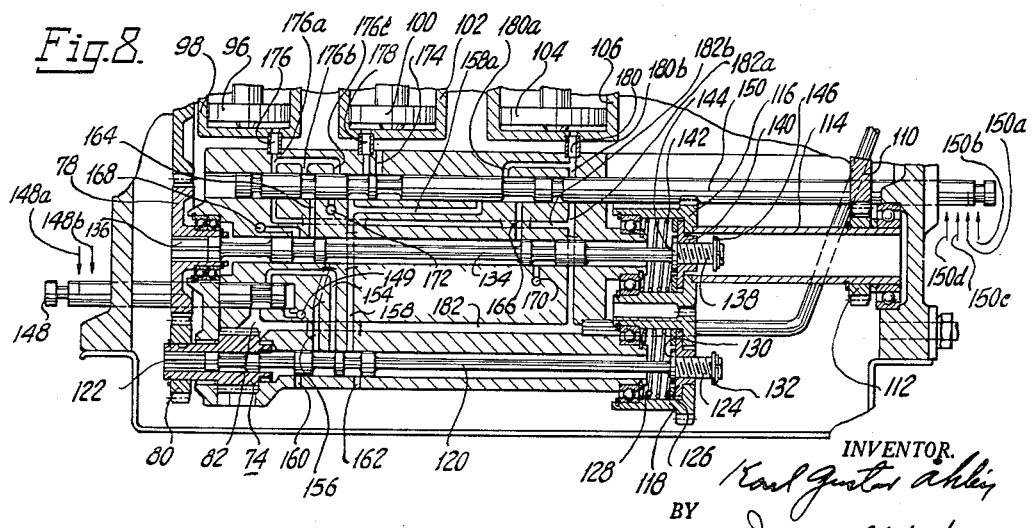

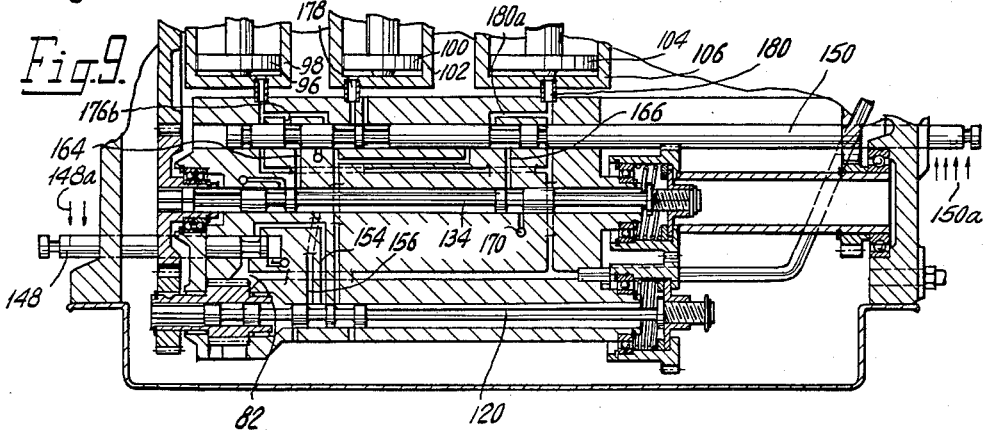
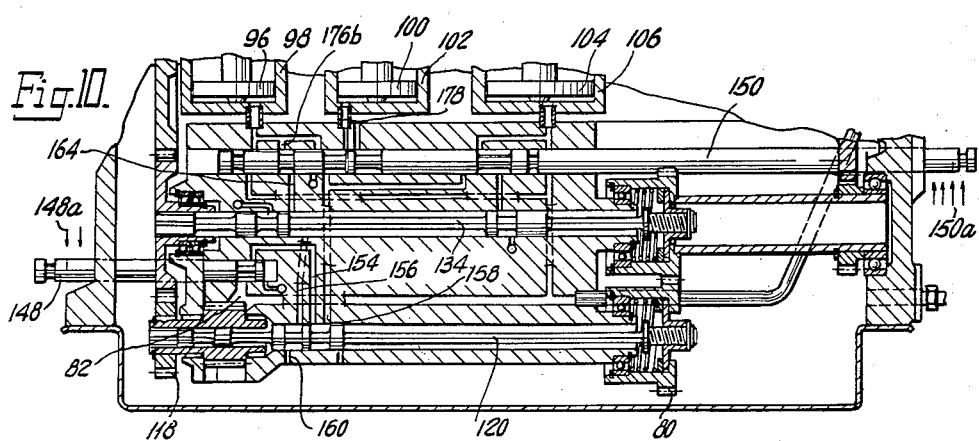
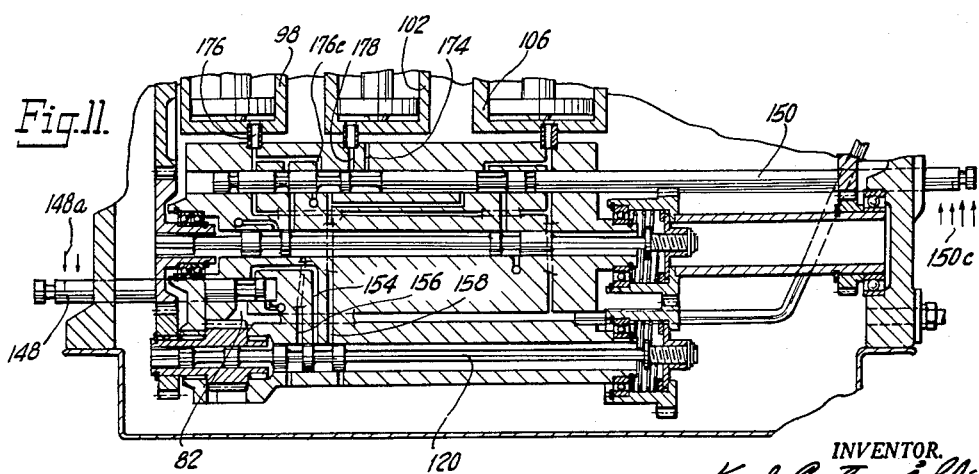

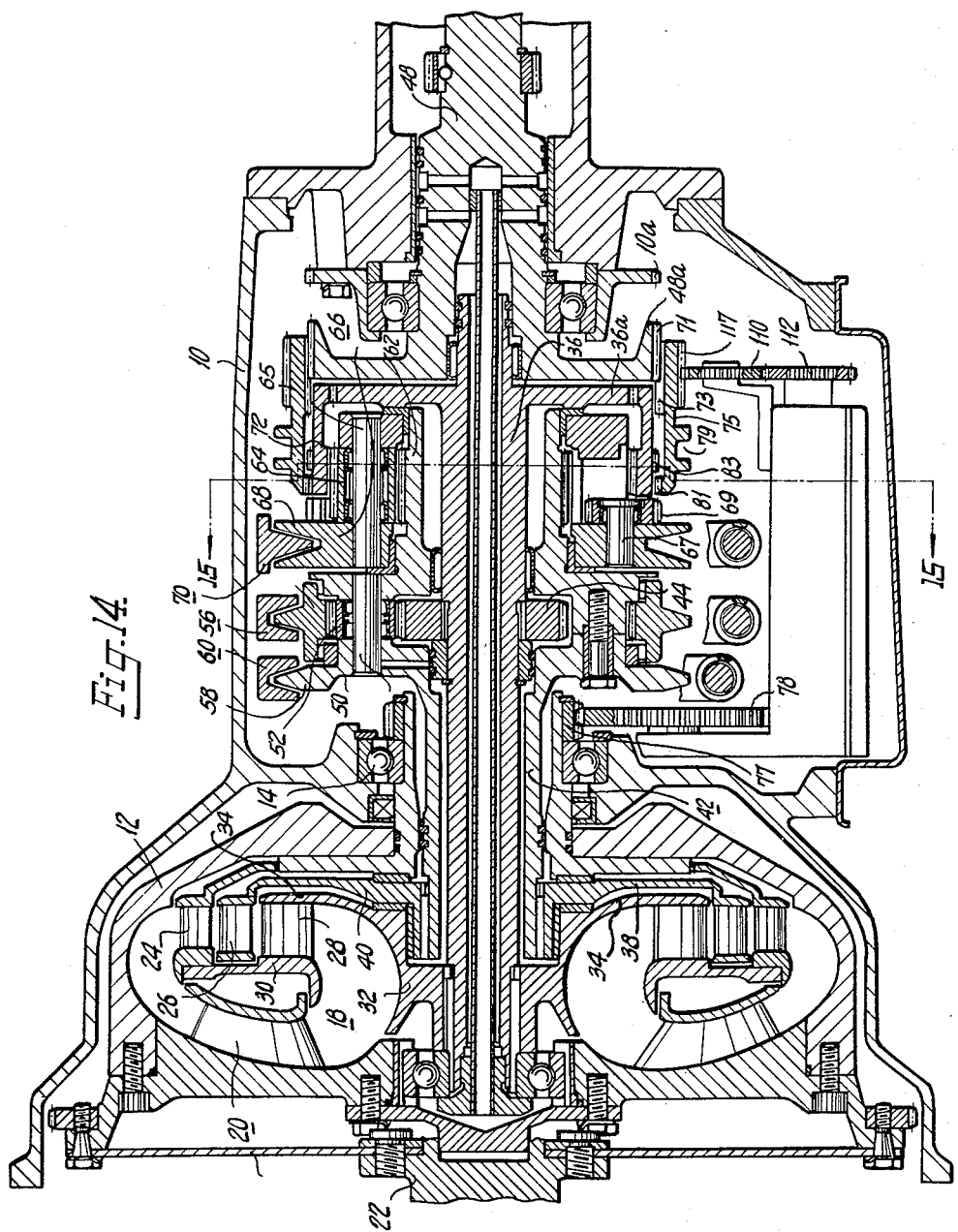

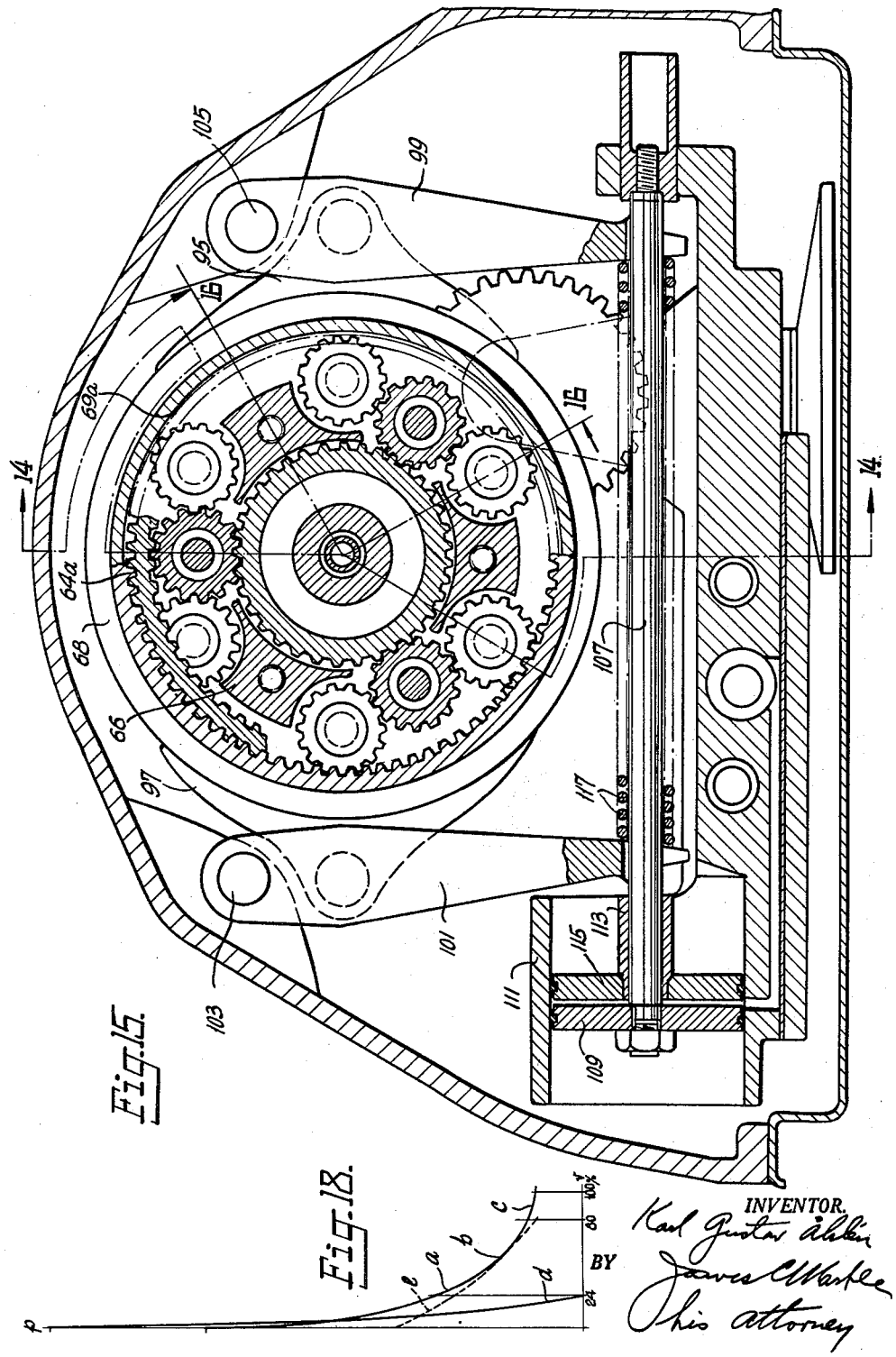

United States Patent Office 3,180,179
Patented Apr. 27, 1965

3,180,179
POWER TRANSMISSION
Karl Gustav Åhlén, Stockholm, Sweden, assignor to Svenska Rotor Maskiner Aktiebolag, Nacka, Sweden, a corporation of Sweden
Continuation of application Ser. No. 645,820, Mar. 13, 1957. This application Feb. 21, 1961, Ser. No. 90,809
41 Claims. (Cl. 74—677)

This application is a continuing application with respect to my co-pending application Serial No. 645,820, filed March 13, 1957, now abandoned, and relates back thereto for all dates and rights incident to the filing thereof.

The present invention relates to variable speed power transmissions and has particular reference to such transmissions for driving vehicles the motive power for which may be internal combustion engines, electric motors or the like the speeds of which may desirably be kept relatively constant as compared with the speed of the vehicle, which may vary from zero speed or stall to very high cruising speeds requiring the rotative speed of the drive line of the vehicle to which the driven or output member of the transmission is connected to be substantially as high as and even higher than that of the input member of the transmission when the latter is driven at the speed attained when the power plant is operated at its maximum desirable speed.

More particularly, the invention relates to such transmissions of the hydrodynamic torque converting type in which hydraulic working fluid is circulated in a closed circuit having pump or impeller blades forming a driving or input member for creating the circulation, and reaction and turbine blading through which the fluid is circulated, the latter blading being carried by a turbine member constituting the driven or power output member of the converter.

Heretofore many different types of hydrodynamic variable speed power transmissions have been developed for vehicle drives, including torque converters for use as torque multiplying devices in the relatively low speed ranges of the vehicle, combined with either a mechanical driving connection or a hydraulic coupling for use instead of the converter drive within the high or cruising speed range of the vehicle which does not require torque multiplication. In still other previously proposed arrangements, hydrodynamic torque converters have been employed in which in different ranges of the speed ratio of the turbine member relative to the pump member, different hydraulic torque converting drives have been established, as for example with the turbine and reaction members rotating in counter direction in a first range of operation wherein the value of such ratio is relatively low and shifting to operation with the reaction member hold rotationally stationary in a second range of operation wherein the value of such a ratio is higher. Such converters having distinctly different hydraulic driving relations in different ranges of the speed ratio, have also been combined in vehicle drive with direct mechanical drive for use as a final or high speed crusing drive for the vehicle.

While various combinations of such different types of drive are known in the art, all of those hitherto proposed present cetrain deficiencies for certain types of applications and it is the general object of the present invention to provide an improved form of transmission unit of the hydrodynamic type that will provide definite improvement in operating characteristics as compared with previously developed forms of transmissions and which will be practically applicable to the propulsion of vehicles of a wide variety of sizes and powers.

A hydrodynamic transmission according to the invention comprises a casing enclosing a closed hydraulic circuit in which are located a pump or impeller member, a driven turbine member and a reaction member, and also comprises a mechanism controlling the operation of the reaction member relative the turbine member. That mechanism includes gear means interconnecting the reaction and turbine members in such a way that the reaction member has to rotate in the same direction as the turbine member at a fixed speed ratio independent of the direction of the power transmission through the gear means. In this way at speed ratios between the turbine member and the pump member at which the speed ratio is below the coupling point i.e. the speed ratio at which the input torque and the output torque of the transmission are the same, so that there is no reaction torque on the transmission and thus no torque at all on the reaction member, the reaction member is forced by the turbine member to rotate in a direction opposite to that in which the working fluid tends to rotate it. The reaction member thus at speed ratios below the coupling point returns power from the turbine member to the working fluid and in this way acts as a second pump member. At speed ratios above the coupling point, on the other hand, the reaction member is acted upon by the working fluid in the same direction as it is rotating and in this way it is acting as a further turbine member absorbing power from the fluid and giving it off to the turbine member.

The reaction member acting in this way directs the flow of the fluid in a very favourable manner, especially at speed ratios in the neighbourhood of and on both sides of the coupling point, so that the top efficiency as well as the coupling point is higher than those values of earlier known hydrodynamic transmissions. The efficiency above the coupling point remains high, up to and even above a speed ratio of 1:1, so that it can be used even in this torque reduction range with very good results.

As a matter of fact, however, the torque absorbing capacity of the transmission decreases so rapidly above a certain value of the speed ratio between the turbine and pump members, due to the speed ratio between the reaction and turbine members, the profiles and the angles of the blades in the hydraulic circuit, etc., so that at an increase of the speed of the output shaft the input shaft will keep pace with it so that the speed ratio between said shafts does change almost not at all and the efficiency of the transmission is still the same high one.

In this way it has been possible to get an all hydraulic over-drive transmission having a definite maximum speed ratio between the output and input shafts and an efficiency that does not decrease below a certain value dependent upon the absolute speed of the output shaft. In this way the losses of the transmission forming heat required to be dissipated can never increase above a value attained at the top power of the motor and these losses will not be higher than the heat losses which must be continuously dissipated at low speed ratios. The efficiency of the whole driving unit comprising the motor and the hydraulic transmission will be as high as a power unit comprising the same motor and a direct clutch drive due to the lower speed of the motor relative that speed with such a clutch instead of the over-drive hydraulic transmission, so that the decrease of efficiency between the direct drive clutch and the hydraulic transmission is compensated for by the increase of motor efficiency.

The mechanism controlling the reaction member may also comprise either or both of gear means interconnecting the reaction and turbine members for drive in opposite directions and a brake for the reaction member so that in the normal operation of the transmission there will be two or three distinct ranges of operation; in the first of which when the driven member is accelerated from stall to a predetermined speed ratio of the output or driven member relative to the speed of operation of the input or driving member of the transmission, the hydraulic unit will operate as a counter-rotation or double rotation torque converter, with the reaction member rotating in a direction counter to that of both the pump member which constitutes the input member and the turbine member which constitutes the power output member of the transmission.

In a second or intermediate range of the ratio of the speed of the driven member to the speed of the driving or input member, the transmission operates as a single rotation converter in which the reaction member is rotationally stationary, being anchored by suitable means to a stationary housing, and with the pump and turbine members rotating in the same direction but at different speeds.

In a third range of operation, in which the speed of the driven or turbine member approaches and even rises above the speed of the pump or input member, the hydrodynamic transmission again reverts to co-rotating operation but in this range the operation differs from that of the initial range in that the reaction member rotates in the same direction as that of the turbine or driven member, but at lower speed, as has already been described in detail.

With a device of the general type briefly described above it is possible to secure a number of new and important improvements in the operating characteristics of the transmission. For example, in the type of drive as above generally described, fluid connection through the hydraulic mechanism is maintained at all times between the driving and the driven members. This insures the elimination of all mechanical shocks between the prime mover and the vehicle drive line, the advantages of which need not be elaborated upon at this time. Additionally, due to the arrangement of the various forms of hydraulic drive, high efficiency is maintained from a relatively low speed of the driven element up to and above speeds at which the speed of operation of the turbine member of the transmission is equal to the speed of the pump member of the transmission. Also, smooth transition from one type of drive to another throughout the speed range is obtained, there being no shift which requires rapid acceleration or deceleration of the parts resulting in the creation of large inertia forces. Parts subject to relatively rapid wear, such as clutch plates, are eliminated and the entire construction may be made more simple and inexpensive than prior constructions intended for the same use.

Furthermore, in accordance with certain features of the invention hereinafter to be more fully pointed out, effective engine and hydraulic braking by means of the working fluid of the hydraulic transmission can be obtained and also there may be effected a positive position in which no appreciable torque or drag is absorbed by the transmission while the turbine member is disconnected from the drive line of the vehicle, so that the prime mover can be operated at any speed for the purpose of testing or for the purpose of charging equipment such as pressure tanks for the storage of compressed air for air brakes and the like.

In the great majority of instances where transmissions of the kind under discussion are to be utilized they are for vehicle drives which require both forward and reverse drive of the vehicle and obviously an additional neutral position is required in which no drive is effected. Further, in many vehicles of the kind to which reference is had, it is desirable to have a positive parking or locked position in which the transmission acts to lock the drive line of the vehicle so that it cannot be moved until the transmission is released from the so-called parking position. Further, it is desirable to have a possibility to change from forward to reverse drive only by actuating brake bands, the reason being for instance the necessity to rock the vehicle out of a mud hole. For certain applications, such as heavy dirt movers, mountain climbing military vehicles and the like, it is often favourable to have available an extra high torque multiplication.

Heretofore, in transmission systems of this kind, the gearing necessary to provide the various desired kinds of hydraulic drive through the transmission has served only for that purpose and in addition to that a separate gearing has been provided between the power output shaft member of the transmission and the drive line of the vehicle for making connection to provide either forward or reverse drive of the vehicle from the transmission, or to provide a positive neutral or to provide an extra step-up gearing. This requires ordinarily a double set of gears besides those required to obtain the desired torque transmitting relation through the transmission which extra gearings comprise one such for reverse gearing or for neutral position between the transmission and the drive line of the vehicle and another such one for further change down gearing or extra low gear.

It is therefore an additional object of the present invention to simplify the construction required in previous devices of this character so that the types of gearing heretofore employed may be simplified and a single mechanical gearing provided whereby one can obtain not only the desired different types of hydraulic drive between the input end and output members of the converter but may also with a considerable simplification of the gearing arrangement make provision for power transmission to the drive line of the vehicle for either forward or reverse drive and to provide a positive neutral in which no drive is effected to the driving wheels of the vehicle as well as parking brake, with other words to obtain without losing any features a simpler, cheaper, lighter and less space-consuming construction at the same time as the speed in reverse is limited for the sake of safety.

The simplified construction is also advantageous in such cases when it is desirable to have available an extra low gear which is possible to connect and disconnect by actuating brake bands. When the reverse gear is in position for reverse drive, this gear can have a gear ratio together with the hydraulic converter of as much as 12:1 or more without any extra devices being necessary. It is, however, to be noted that this extra low gear is intended to be used only under extraordinary or emergency circumstances as the same does not allow shifting automatically, simply speaking.

To this end, the invention contemplates a new and improved form of transmission embodying a hydraulic torque converter of the type which under some conditions of drive will provide for counter or double rotation drive, which is characterized by a very high stall torque ratio and which is exceedingly useful for low speed operation of the vehicle, for acceleration or for heavy grade work where a high value of multiplication of the torque is desired, such converter shifting under predetermined circumstances to a different type of hydraulic drive in which less torque multiplication is obtained but in which the efficiency of drive through the converter is higher at relatively higher vehicle speed. Such a transmission requires gearing interconnecting the reaction and turbine members of the converter and a primary object of the present invention also is to incorporate into such gearing an arrangement which additionally, through the medium of parts of that same gearing, enables the power output member of the transmission to be connected for either reverse or forward drive or to be maintained in neutral position or to be placed in a position providing a positive parking lock, without requiring a separate gearing between the transmission and the drive line of the vehicle for achieving those purposes as well as the extra low gearing referred to above.

In the drawings:

FIG. 4 is a section taken on the line 4—4 of FIG. 1.

FIG. 5 is a section taken on the line 5—5 of FIG. 1.

FIG. 6 is a view, on a larger scale, of a part of the structure shown in FIG. 1, showing the control mechanism set for neutral position of the transmission.

FIG. 7 is a view similar to FIG. 6 showing the control mechanism set in a position permitting the driven member of the transmission to be connected to the line of the vehicle for either reverse or forward drive through any type of reverse gearing it may be desired to employ.

FIG. 8 is a view similar to FIG. 6, showing the control parts in position for effecting counter-rotation or double-rotation drive, as would be used when starting a vehicle from stall.

FIG. 9 is a view similar to FIG. 6 showing the control parts in a position providing for single rotation operation of the converter which type of operation would normally be in effect at an intermediate speed range of the vehicle driven by the transmission.

FIG. 10 is a view similar to FIG. 6 showing the control mechanism set for drive with co-rotating power absorbing reaction member, whereby the reaction and turbine members are rotating in the same directions.

FIG. 11 is a view similar to FIG. 6 showing the control set for single rotation at hydraulic braking with the converter.

FIG. 12 is a view similar to FIG. 6 showing the control system set for counter rotation or double rotation at hydraulic braking with the converter and FIG. 13 is a diagram illustrative of different operating characteristics of the transmission.

Figure 1:
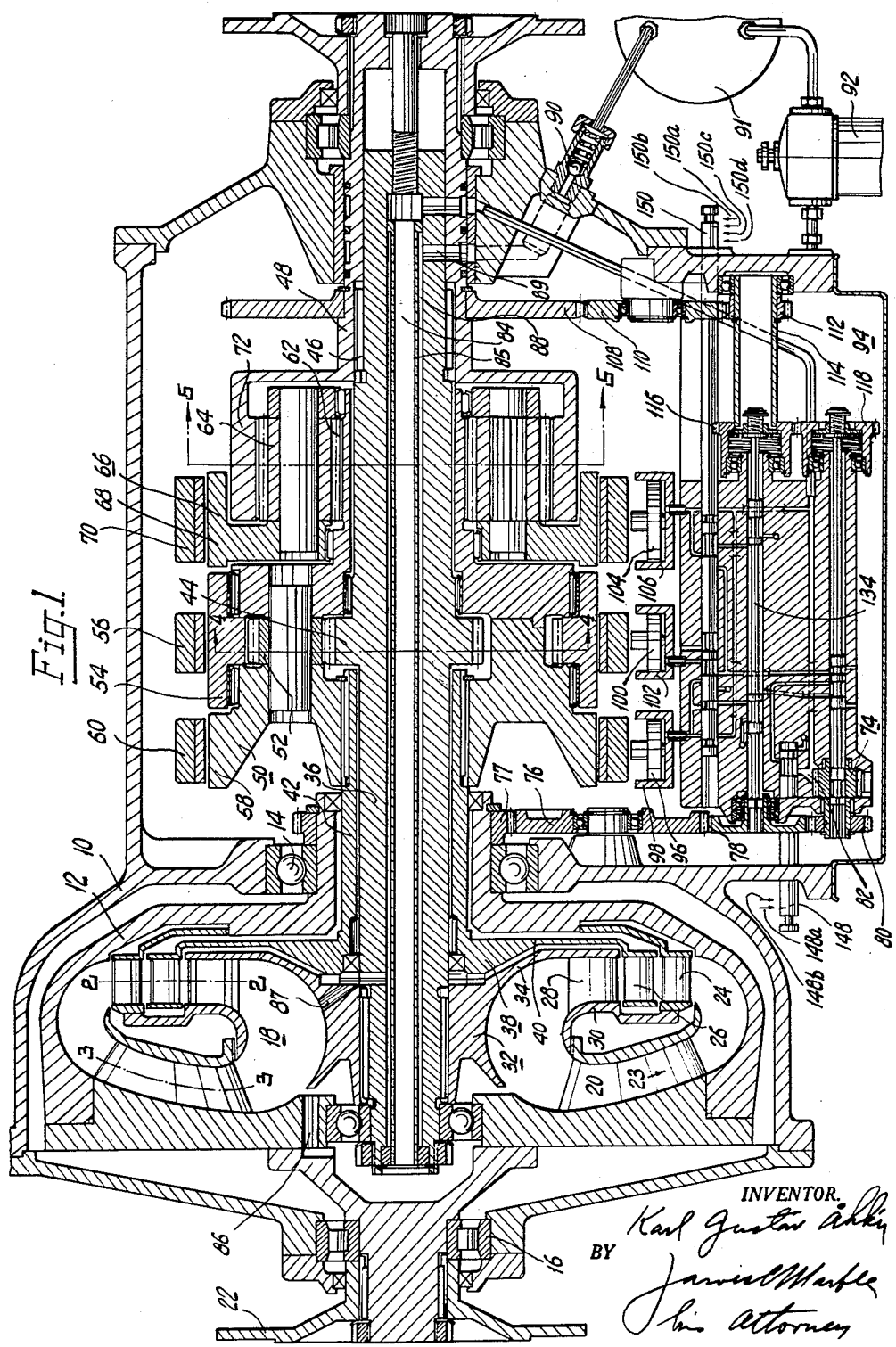
FIG. 1 is a central longitudinal section of a transmission embodying the invention, the drawing being more or less diagrammatic with respect to certain elements and certain elements of the control system being brought into the plane of the drawing for clarity of showing and description.

FIG. 14 is a view similar to FIG. 1 illustrating another modification of a transmission embodying the principles of the invention and incorporating the features pertaining to the reverse gear and the positive neutral and the parking positions of the control, not embodied in the embodiment previously described herein, but which may readily be incorporated in a transmission such as that shown in the embodiment illustrated in FIG. 1.

FIG. 15 is a transverse section taken on the line 15—15 of FIG. 14.

Figure 16:
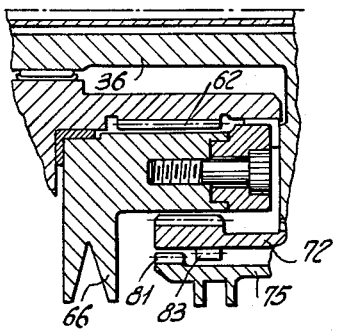

FIG. 16 is a partial section taken on the line 16—16 of FIG. 15.

Figure 17:
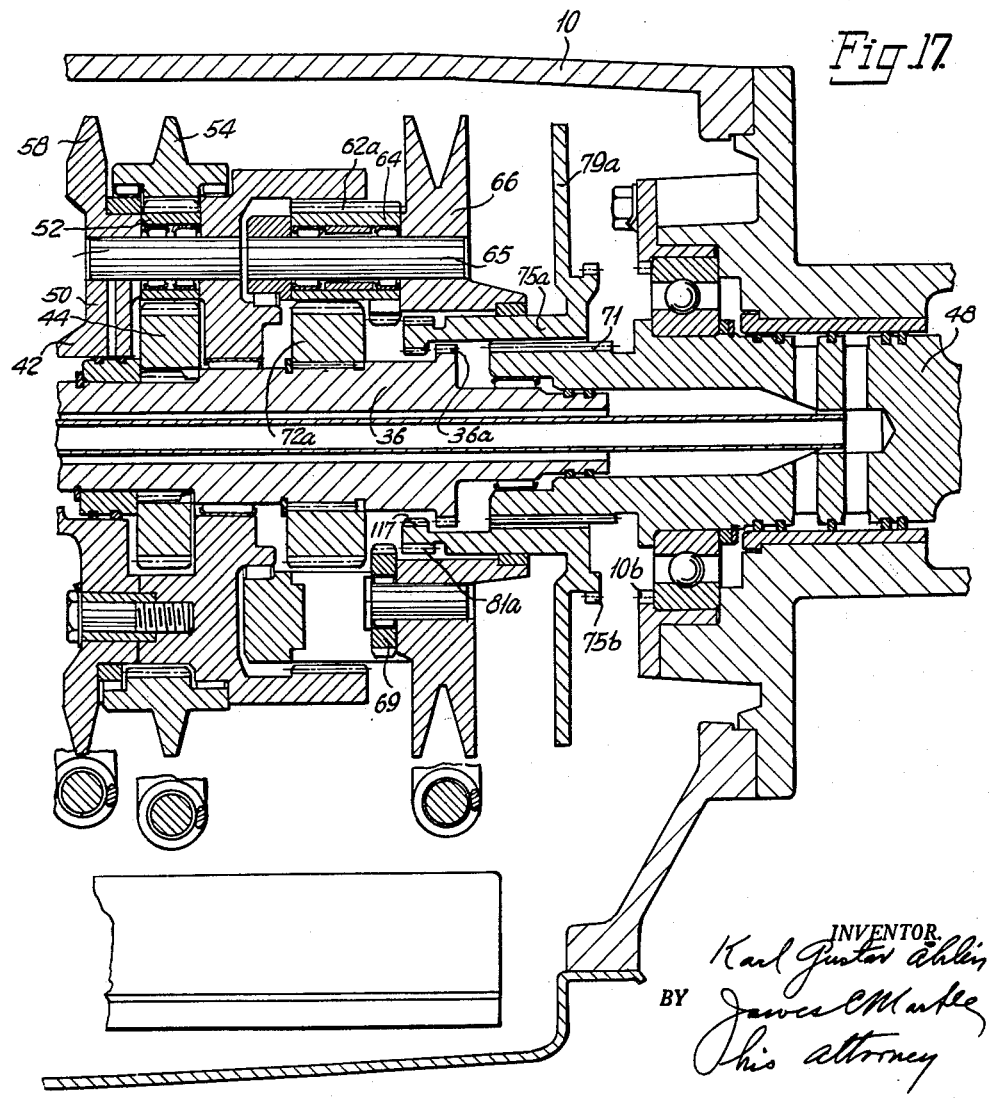

FIG. 17 is a longitudinal central section of the gear mechanism of a further embodiment of the invention as compared with the embodiment shown in FIG. 14 and FIG. 18 is a diagram illustrative of tractive effort obtainable in ordinary drive and with the extra low gear drive.

Referring now more particularly to FIG. 1 of the drawings, the transmission comprises a rotationally stationary outer housing 10, within which there is rotatably mounted the casing 12, carried by main bearings 14 and 16.

Casing 12 provides the cavity for the hydraulic circuit indicated generally at 18 and also carries the integrally mounted blades 20 forming the pump or impeller member.

The casing 12 is connected by any suitable means such as the flange connection 22 to the power plant from which power is delivered to the transmission.

The pump or impeller blades circulate the hydraulic fluid in the circuit in the direction indicated by the arrow 23, the fluid passing first through a first stage of turbine blading 24, next through a stage of reaction blading 26 and finally through a second stage of turbine blading 28 before being returned to the inlet side of the pump blading 20.

The two stages of turbine blading 24 and 28 are connected by the ring member 30 forming a part of the core of the structure providing the hydraulic circuit.

The turbine or driven member indicated generally at 32 has a hub portion 34 carrying turbine blades 28 and a shaft portion 36 which is rotatably mounted relative to the rotating casing 12.

Reaction blades 26 are carried by a reaction member indicated generally at 38 and comprising a hub portion 40 and a shaft portion 42, the reaction member being rotatably mounted both with respect to the turbine member 32 and the rotating casing 12.

The shaft part 36 of the turbine member is provided with a gear 44 fixed therewith which forms the sun gear of a planetary gear train forming one part of a compound gearing later to be described in more detail.

The turbine shaft 36 is also keyed or splined as at 46 to a power output member 48 having a flange or equivalent connection for transmitting power to the drive line of a vehicle.

The shaft part 42 of the reaction member 38 is keyed or splined to the planet carrier 50 carrying planets 52 forming a part of the gear train of which gear 44 is the sun gear. This gear train is completed by the ring gear 54 having internal teeth with which planets 52 mesh as well as with the teeth of sun gear 44. Ring gear 54 is rotationally mounted to rotate in either direction unless anchored or held against rotation by the selectively engageable or releasable brake 56.

The planet carrier 50, at one side of the planets 52, has an extension providing a cylindrical brake drum 58 located to be releasably engaged by the brake 60 to hold the carrier either rotationally stationary or to permit it to rotate.

On the side of the planet carrier 50 opposite that providing the drum 58, the carrier has an extension providing the sun gear 62 of a second planetary gear train.

The sun gear 62 meshes with planets 64 mounted in the planet carrier 66 having a drum portion 68 located to be releasably engaged by the brake 70 to lock the carrier against rotation or to permit it to rotate, as desired. Plane 64 of the second gear train meshes with the internal teeth on ring gear 72, the latter gear being fixed to or integral with the output member 48 to which the turbine member of the converter is fixed at 46.

So far as the hydraulic circuit illustrated herein is concerned the form of the circiut and the form and arrangement of the blading may advantageously be as disclosed in my prior U.S. patent No. 2,690,054, granted September 28, 1954, but it will be understood that the invention is not limited to this particular form of hydraulic circuit.

For obtaining the various kinds of hydraulic drive contemplated by this invention, a hydraulic pressure fluid control system is employed which includes automatically operable regulating valves for changing the flow of the hydraulic control fluid to effect different hydraulic driving relations through the converter in accordance with changes in the ratio of the speed of the turbine member in relation to that of the pump member of the transmission.

The speed of the turbine member, in terms of revolutions per minute, is ordinarily referred to as $n_2$, while that of the pump member is ordinarily referred to as $n_1$. The ratio just referred to is $n_2/n_1$ and said ratio will hereinafter be sometimes referred to as the speed ratio of the converter or transmission and sometimes designated by the above symbol.

The control system also includes a selectively operable valve movable to a position in which the supply of pressure fluid to said regulating valves may be cut off to permit the creation of a condition under which the converter is incapable of absorbing any appreciable input torque, so that the power plant may be tested or used for purposes other than drive through the transmission without being subjected to a load of any significance from the latter.

Additionally, the system includes a selectively operable valve movable to a number of different positions for determining different characters of hydraulic braking to be effected, for permitting the different hydraulic driving relations to be established in accordance with the action of the regulating valves and for holding the turbine member of the converter rotationally stationary, regardless of the positions of any of the other valves in the system, in order to permit the output member of the transmission member to be readily connected or disconnected to the drive line of a stationary vehicle for either forward or reverse drive.

Referring again to FIG. 1 the elements of this control system have been brought more or less diagrammatically into the plane of the figure, and will now be described more in detail.

As is well known in the art, it is desirable when power is being transmitted through a hydrodynamic torque converter of the kind under consideration, that the hydraulic power transmitting fluid to be kept under positive pressure and in the present construction positive pressure is supplied for the working fluid in the hydraulic circuit, as well as positive pressure for the control fluid, by means of a gear pump 74, one of the gears of which appears in the figure. Pump 74 is driven by a train of gears rotationally mounted in a part of the stationary housing structure and consisting of transfer gear 76 driven by a suitable gear 77 or the rotating casing 12 and meshing with a gear 78, which in turn drives gear 80 fixed to the pump drive shaft.

The hydraulic fluid delivered under pressure from pump 74 is conducted through conduit 82 to the central passage 84 formed by a tube 85 mounted in the bore of the hollow shaft part 36 of the turbine member. From the forward end of passage 84 the fluid passes through one or more suitable apertures 86 into the rotating casing to the cavity providing the hydraulic circuit 18. From the latter the fluid passes through suitable apertures 87 into the hub portion of the turbine member to the annular passage 88 formed around tube 85. From the rear end of the annular passage 88 the fluid flows through a suitable conduit 89 formed in the stationary structure and past a loaded pressure relief valve 90, which operates to maintain the fluid system under a desired minimum pressure, to a cooler 91. From the latter the fluid is returned by way of filter 92 to the sump 94 which supplies the pump 74 with fluid. Systems utilizing positive displacement pumps and pressure relief valves, for circulating hydraulic fluid through the circuit of a hydrodynamic torque converter and for maintaining a desired minimum pressure of the working fluid in the circuit, are previously known in the art and the fluid circulation system just described forms per se no part of the present invention.

The pump 74, however, does provide a source of hydraulic fluid under pressure for actuation of the control system constituting a part of this invention, and pressure fluid delivered by pump 74 for the purpose of maintaining the hydraulic circuit under pressure is thus advantageously used to operate the control system hereinafter to be described.

As previously noted, the compound planet carrier 50 includes a drum portion 58 which is anchorable against rotation by a brake band 60. The ring gear 54 is anchorable by a brake band 56 and the drum portion of planet carrier 66 is anchorable by the brake band 70.

The means for engaging or releasing these several brake bands are shown diagrammatically in the plane of the drawing.

In FIG. 1 brake band 60 is shown as being adapted to be engaged or released by the action of the piston 96 operating in cylinder 98. Brake band 56 is shown as being adapted to be engaged or released by the action of piston 100 acting in cylinder 102, and brake band 70 is shown as being adapted to be engaged or released by the action of piston 104 acting in cylinder 106.

For suitable mechanical arrangements for effecting the engagement or disengagement of brake bands of the kind herein diagrammatically disclosed, reference may be had to my prior U.S. Patent No. 2,719,616, granted October 4, 1955, which discloses such means operating by pistons actuated by hydraulic pressure fluid.

Referring to FIG. 1 it will be observed that the driven member of the transmission is provided with a gear 108 meshing with a transfer gear 110 mounted in a rotationally stationary part of the transmission, the latter gear meshing with a gear 112 also mounted in the rotationally stationary housing. Gear 112 is carried by a sleeve 114 which in turn carries a gear 116 which is in alignment with gear 78 and which meshes with gear 118 mounted in alignment with gear 80 of the train driving the gear pump.

As will be noted from the drawing, the speed of the gear 80 will be indicative of the speed of rotation of the pump or input member of the transmission and the speed of the gear 118 will be indicative of the speed of operation of the turbine or output member of transmission. Consequently, the relative speed between these two gears will be indicative of the relative speeds of operation or speed ratio between the pump and turbine members of the transmission. This speed ratio is utilized, in accordance with one aspect of the invention, to automatically establish different driving relations of hydraulic drive for different ranges of speed ratio. To accomplish this, two automatically operable regulators are provided which are responsive to changes in the speed ratio in a manner later to be described in more detail. For the sake of brevity these regulators will hereinafter be referred to as "ratio regulators."

A first one of said regulators comprises a piston type valve 120 FIG. 6 rotatably mounted and axially shiftable between the end positions in a suitable bore forming a valve chamber in a part of the stationary housing. Valve 120 is driven, at one end, by means of splines 122, at the same speed as that of gear 80. At its other end valve 120 engages, by means of helical threads 124, a friction plate plate 126 held in frictional engagement with gear 118 by means of spring 128.

As shown in FIGS. 1 and 6, valve 120 is in its right hand end position which is determined by abutment of the flange 130 on the valve against the friction member 126. The direction of the lead, or band, of the threads 124 is such that this axial position of the valve is taken when gear 80 rotates the valve at higher speed than that of gear 118. Valve 120 may rotate at a speed different from that of gear 118 because of the slipping connection provided by the friction member 126. On the other hand, if gear 118 is rotated at a higher speed than that of gear 80, the friction drive from gear 118 on member 126 will cause the latter to turn on valve 120 and the threads 124 will, as a result of this action, shift valve 120 axially to its left hand end position, which is determined by abutment of the collar 132 against member 126.

The second ratio regulator is similar in construction and action to the first regulator just described. It comprises a rotatably mounted and axially shiftable piston valve 134 provided with a spline connection 136 through which it is rotated at the speed of gear 78. Helical threads 138 connect the valve with the friction member 140 which is held in pressure contact with gear 116 by spring 142. Flange 144 on valve 134 determines the right hand end position of the valve while collar 146 determines its left hand end position. The lead, or band, of threads 138 is such that if the speed of gear 78 exceeds that of gear 116, the valve takes its right hand end position as shown in FIGS. 1 and 6, whereas if the speed of gear 116 exceeds that of gear 78, the valve shifts axially to its left hand end position.

In addition to the ratio regulator valves the system includes a selectively operable valve hereinafter for convenience called an overrule valve since it is capable of being shifted from a first position, in which it permits hydraulic pressure fluid to flow from pump 74 to the ratio regulator valves, to a second of overrule position in which it cuts off such flow and thus overrules the action which normally would result from the automatic positioning of the ratio regulating valves.

As shown in FIG. 8, the overrule valve 148 is an axially shiftable piston type shiftable from a left hand end position as indicated in the figure and as designated by arrow 148a, to a right hand end position indicated by arrow 148b. The chamber of the overrule valve is provided with a vent passage 149.

The control system further includes a valve 150, independent of the positioning of the other valves of the system and hereinafter for convenience termed a selector valve which is movable at the will of the operator to different positions in some of which in conjunction with the positioning of other valves in the control system, will permit hydraulic drive through the transmission, will effect hydraulic braking, will act to effect locking the turbine member of the transmission against rotation to enable it to be coupled to the drive line of the vehicle for either forward or reverse drive of the vehicle or will release the reaction member to rotate without any absorption of power.

In the embodiment illustrated, the selector valve 150 is a piston type valve axially shiftable to a number of different positions, in one of which, 150a as shown in FIG. 1, it permits any of the various possible types of hydraulic drive to be accomplished in accordance with the action of the automatic ratio regulators unless drive through the transmission is prevented by manipulation of the overrule valve, in a second of which 150b it operates to cause the turbine member to be held against rotation regardless of the position of any of the other valves in the system, in a third of which (150c) it permits single rotation hydraulic braking to be accomplished subject to the positioning of the overrule valve, and in a fourth of which (150d) it permits counter rotation hydraulic braking to be accomplished, again subject to the positioning of the overrule valve and of the ratio regulators.

Reverting to pump 74 it will be seen that the discharge side of the pump is connected to deliver pressure fluid through conduit 82 to the valve chamber of the overrule valve 148. A conduit 154 leads from the overrule valve chamber to the valve chamber of the ratio regulator 120. From the latter chamber a conduit 156 leads to the valve chamber of the second ratio regulator 134 and a conduit 158 leads to the valve 150. Conduit 158 has a branch 158a opening into the selector valve chamber at a place spaced from the place where conduit 158 opens into the chamber. The chamber of the ratio regulator valve 120 is further supplied with two axially spaced vent passages 160 and 162.

Axially spaced conduits 164 and 166 connect the valve chamber of ratio regulator 134 with the valve chamber of the selector valve 150, the chamber of the regulator being provided with two vent passages, 168 and 170, while the chamber of the selector valve is provided with two vent passages 172 and 174, FIG. 8.

The valve chamber of the selector valve is connected to the cylinder 98 in which piston 96 is located, by a conduit 176 which communicates with the valve chamber through three spaced branches 176a, 176b, 176c. The selector valve chamber is also connected with cylinder 102 in which piston 100 is located, by conduit 178, and said chamber is further connected with cylinder 106 in which piston 104 is located by conduit 180, the latter communicating with the chamber through two spaced branches 180a and 180b.

From the supply conduit 82 which furnishes working fluid under pressure to the converter circuit a conduit 182 communicates with the valve chamber of the selector valve 150 at two spaced places through branches 182a and 182b.

As previously noted, it is desirable to provide a neutral position for the converter in which the transmission imposes no appreciable load on the engine, it being assumed that the driven or output member of the transmission is disconnected from the drive line of the vehicle so as to be free to rotate at engine speed so far as the vehicle is concerned. To effect this all three of the brake actuating pistons 96, 100 and 104 must be relieved of fluid pressure by venting their respective cylinders, and as shown in FIG. 6 this may be accomplished by moving the overrule valve 148 to its right hand position 148b. In this position the valve cuts off the supply of pressure fluid from conduit 82 leading from pump 74 and also connects conduit 154 with the vent passage 149, thus permitting cylinder 106 to be vented via the conduits 180a, 166, 156 and 154 and vent 149. Cylinder 102 is vented via conduits 178, 158 and vent passage 162. Cylinder 98 is vented via conduits 176b, 164 and vent passage 168.

With all three cylinders vented and brakes associated therewith released, both the reaction and the turbine members are free to rotate with and at the same speed as that of casing 12 carrying the pump blades. Consequently there can be no appreciable torque absorption by the converter. As shown in FIG. 6, both of the ratio regulators are shown in their right hand positions, indicative of a relatively low value of the speed ratio $n_2/n_1$. However, under the assumed conditions, the turbine member will be accelerated to a speed producing an increase in the speed ratio such that first the ratio regulator 134 will be shifted to its left hand position and then the ratio regulator 120 will be shifted to its left hand position. These shifts in position of the regulators will not, however, operate to cause pressure fluid to be admitted to any of the brake cylinders, so long as valve 148 is maintained in its right hand position which cuts off the supply of fluid from pump 74, but will operate only to change the paths through which the cylinders are vented. If and when regulator 134 shifts to its left hand position, cylinder 106 is vented via conduits 180a, 166 and vent passage 170, cylinder 102 continues to be vented as before and cylinder 98 is vented via conduits 176b, 164, 156, 154 and vent passage 149. If and when regulator 120 shifts to its left hand position, the venting of cylinder 106 remains as before, cylinder 102 is vented via conduits 178, 158, 154 and vent passage 149, while cylinder 98 will be vented via conduits 176b, 164, 156 and vent passage 160.

It will thus be seen that with the valve 148 in its right hand position release of pressure fluid from all of the brake cylinders cannot be affected by shift of position of either one or both of the ratio regulators and to this extent valve 148 may be considered as an overrule valve.

In order to permit the transmission to be readily connected to the drive line of a vehicle either for forward or reverse drive, or to change from one or the other of such drives to the other, it is desirable to lock the turbine or output member of the transmission against rotation. This is accomplished in the present construction by shifting the selector valve to its right hand end position 150b, as shown in FIG. 7. With the selector valve in this position, pressure fluid is taken from the conduit 82 of the main fluid circulating circuit and delivered via conduit 182 and its branch 182a to branch 180b of conduit 180. Branch 180a of conduit 180 is blocked by valve 150 in this position and pressure fluid is delivered to cylinder 106 to actuate piston 104 and apply brake 70, thus holding planet carrier 66 against rotation. Pressure fluid is also delivered via branch conduit 182b, branch conduit 176a and conduit 176 to cylinder 98 to actuate piston 96 and hold the planet carrier 50 against rotation by means of brake 60. Branches 176b and 176c of conduit 176 are blocked off by parts of valve 150 in this position of the valve as will be seen from the figure.

With the planet carrier 66 of the second gear train held against rotation and the planet carrier 50 of the first gear train, which carries the sun gear of the second gear train, also held against rotation, the ring gear 72 of the second gear train is held against rotation. Since the latter is fixed to the turbine member, it also is held rotationally stationary. Since in the position of valve 150, just described, the pressure fluid for applying brakes 60 and 70 is derived from the supply conduit 82 of the main fluid circulating system, rather than from conduit 154 by way of the overrule valve 148 which controls the flow of pressure fluid to the ratio regulators, it follows that the position of the latter valve does not influence the action of the apparatus. If valve 148 is in its right hand position 148b, it will cut off the flow of pressure fluid to the ratio regulators but for the reason just explained this is immaterial. In order, however, to more fully demonstrate the lack of effect of the position of this valve, it has been shown in its left hand position 148a in which it admits pressure fluid from supply conduit 82 through conduit 154 to the ratio regulator 120. From the latter, pressure fluid is conducted to the ratio regulator 134 via conduit 156, from which it is conducted via conduit 166 to the selector valve. In the assumed position 150b of the selector valve, this fluid from source 82 is blocked off from further flow by piston parts of the selector valve member. In FIG. 7 both of the ratio regulators are shown in their right hand positions, since these are the positions they would naturally have under any conditions when it would be desirable to lock the turbine member to enable the transmission to be connected to the drive line of the vehicle or to change the direction of drive.

Figure 2:
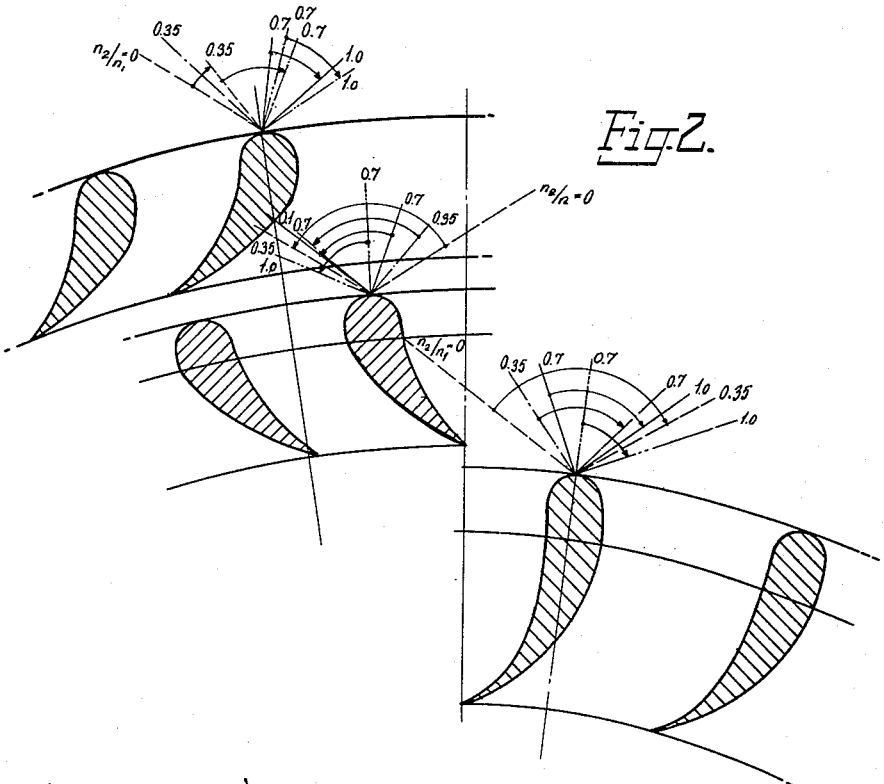
FIG. 2 is a section taken on the line 2—2 of FIG. 1, illustrative of profiles of the blading of the turbine and reaction members and also diagrammatically indicating variations in the relative inlet angle of flow of hydraulic fluid to the inlets of the various blade rows under different operating conditions of the transmission.
Figure 3:
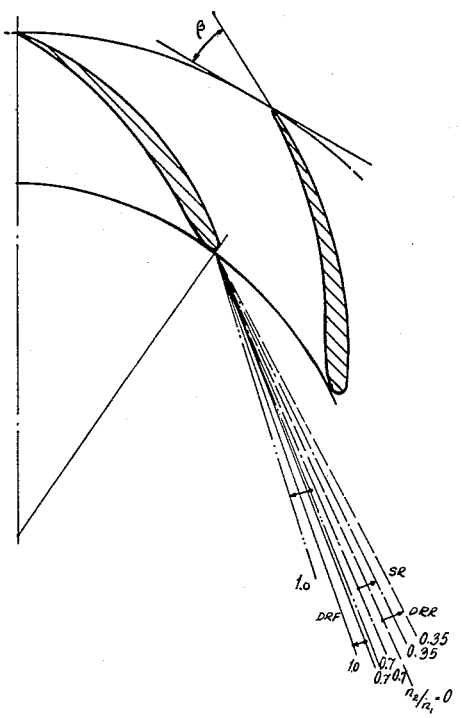
FIG. 3 is a section taken on the line 3—3 of FIG. 1, showing in profile the blading of the pump or impeller member and also showing diagrammatically the variations in the inlet angle of flow of hydraulic fluid to the pump blades under various conditions of operation of the unit.

Once the transmission has been connected to the drive line of the vehicle, and assuming it has been connected for forward drive, let it further be assumed that it is desired to accelerate the vehicle from stall to cruising speed. Valve 150 is shifted to normal operating position 150a and the overrule valve 148 is placed in its left hand position 148a to admit pressure fluid to the control system from source 82. Under the assumed condition of the vehicle being motionless, both the ratio regulators will be in their right hand position, and the setting of all the valves as just described is shown in FIG. 8. As will be seen from this figure, pressure fluid derived from conduit 82 directly as a source is cut off by the selector valve 150, but pressure fluid from 82 as a source is conducted via valve 148, conduit 154, regulator 120, conduit 156, regulator 134, conduit 166, valve 150 and branch conduit 180a to cylinder 106, thus holding the planet carrier 66 of the second gear train stationary. Meanwhile cylinder 98 is vented via conduit 176b, valve 150, conduit 164, ratio regulator 134 and vent passage 168, while cylinder 102 is vented via conduit 178, valve 150, conduit 158, ratio regulator 120 and vent passage 162. Thus, with this valve setting both the planet carrier 50 and the ring gear 54 of the first gear train are free to rotate so far as the brakes are concerned. Referring now to FIGS. 2 and 3, it will be seen that the pump blades 20 are disposed to be rotated in clockwise direction in order to create circulation of working fluid in the hydraulic circuit. Turbine blades 24 and 28 are disposed to be driven in the same direction by the action of the working fluid.

Since the reaction blades 26 are connected to the planet carrier 50, which also includes the sun gear 62 meshing with the planets 64 of the carrier 66, it is evident that under the presently assumed setting of the control system which holds the carrier 66 stationary, the reaction blading must rotate in the direction opposite that of the turbine blading, planets 64 rotating about their own rotationally stationary axes and reaction torque being transmitted by way of the carrier 66 and brake 70 to the stationary structure 10. Thus counter-rotation, double-rotation drive is obtained and it is to be noted that in the gearing shown, the reaction blading must rotate at higher speed than the turbine blading because of the difference in diameters of the sun gear 62 and the ring gear 72 meshing with pinions 64. This is desirable since the contribution to the total torque multiplication at stall made by the reaction member is proportional to the relative speeds of the turbine and reaction members. In the example illustrated, the ratio of the planetary gearing is such that the reaction blading will rotate at about 1.8 times the rotative speed of the turbine blading.

For reasons hereinafter to be more fully discussed, counter rotation or double rotation drive is desirable for use only within a first range of relatively low values of the speed ratio $n_2/n_1$ and in the present construction the arrangement is made such that counter-rotation drive is maintained only within the range in which the value of the speed ratio is less than 0.35.

This is accomplished by selecting gears 108, 110 and 112 on one hand and gears 77, 76 and 78 on the other hand are being dimensioned with such relative diameters that when the speed of the turbine member is above 35% of that of the pump member the friction plate 140 of the ratio regulator 134 is rotated at higher speed than that of the valve member and the latter is shifted to its left hand position to thereby bring into action a different kind of hydraulic drive in which the reaction blading is held stationary and only the pump and turbine members rotate. In other words, it can be said that the speeds of the two elements controlling the axial position of the regulator 134 cross at a value of the speed ratio $n_2/n_1$ of 0.35. The manner in which the shift of the regulator valve 134 to its left hand position effects this change in the driving relation is illustrated in FIG. 9. Cylinder 106, previously supplied with pressure fluid to actuate piston 104 and apply brake 70 to hold the planet carrier 66 rotationally stationary, is now vented via conduit 180a, valve 150, conduit 166, valve 134 and vent passage 170, to release brake 70 and free the planet carrier 66. Brake cylinder 102 remains vented, as before. Cylinder 98, instead of being vented as before, is supplied with pressure fluid from source 82 via valve 148, conduit 154, regulator valve 120, conduit 156, regulator valve 134, conduit 164, valve 150 and conduit 176b. This causes brake 60 to be applied to hold the planet carrier 50, and the reaction member 38 fixed thereto, rotationally stationary. The release of brake 70, freeing the planet carrier 66, permits the sun gear 62 to be held stationary while the turbine member rotates in accordance with the torque applied thereto from the turbine blading 24 and 28. Reaction torque in the present instance is transmitted from blading 26 via planet carrier 50 and the brake 60, to the stationary structure.

For reasons also to be discussed later, the type of drive just described with the reaction blading stationary and for convenience called single rotation drive, is most advantageously employed in and confined to an intermediate range of values of the speed ratio $n_2/n_1$. In the present embodiment, this intermediate range is chosen to include the ratio values of 0.35 as the lower limit and 0.70 as the upper. When the upper limit is reached or exceeded, the second ratio regulator 120 is shifted to its left hand position, the regulator 134 of course remaining in its left hand position. The shift of regulator 120 to its left hand position at ratio 0.70 is accomplished by the selection of gears 80 and 113 of appropriate diameter with respect to the gears by means of which they are driven, so that when the speed ratio $n_2/n_1$ reaches 0.70 the speeds of rotation of the valve member of the regulator 120 and the friction member 126 cross and the valve member is shifted to left hand position by the action of the threads 124. With both the ratio regulators in left hand position, the setting of the control system is as shown in FIG. 10. Cylinder 106 remains vented through the passages as previously described in connection with FIG. 9 so that the planet carrier 66 is free to rotate so far as brake 70 is concerned. Cylinder 98, which for single rotation drive is supplied with pressure fluid as shown in FIG.

9 in order to hold planet carrier 50 and reaction blading 26 stationary, is now vented via conduit 176b, valve 150, conduit 164, regulator valve 134, conduit 156, regulator valve 120 and vent passage 160, thus releasing carrier 50 and leaving the reaction blading 25 free to rotate so far as the brake is concerned.

Cylinder 102, which in all of the previously described settings of the control system has been vented, is, however, now supplied with pressure fluid from source 82 via valve 148, conduit 154, regulator valve 120, conduit 158, valve 150 and conduit 178 to cause brake 56 to be applied to hold the ring gear 54 of the first planetary gear train against rotation.

By reference to FIG. 4 it will be evident that with this setting the reaction blades are constrained to rotate in the same direction as the turbine blades, but at a lower speed. Gear 44, forming the sun gear of the planetary train is rotated clockwise as viewed in this figure by the torque applied to the turbine member by the action of the working fluid in the circuit of the turbine blades 24 and 28. Since the ring gear 54 is stationary, and the sun gear 44 is rotating clockwise, the planet gears 52 can only turn counter-clockwise around their own axes of rotation to in effect roll in clockwise direction within the ring gear, thus rotating the planet carrier and the reaction blading 26 in clockwise direction. Torque is transmitted to the stationary structure in this arrangement via the ring gear 54 and brake 56.

Except the conditions of drive and power transmission relations heretofore described, there also exist certain possibilities to provide for hydraulic braking. The manner in which such hydraulic braking may be realized is based thereupon that the drive is brought about at such speed ratios that the turbine becomes driving the pump. In the apparatus shown and above described such a driving relation is set in as follows from the curves diagrammatically shown in FIG. 13 at a speed ratio about approximately 1.3 at single rotation drive and at about approximately 0.5 when the reaction member is rotating in reverse or counter direction. If the speed of the engine is decreased by reducing the throttle openings at a vehicle speed corresponding to the speed ratio for the actual kind of drive in question, the vehicle will start to drive the engine at the speed ratios just referred to. As the transmission according to the invention is constructed to be shifted automatically, the drive conditions or relations of the kind now under consideration will in ordinary cases only occur when the valves of the control system are set in the position such as shown in FIG. 10. If, however, the valve 150 is manually moved to its position 150c as shown in FIG. 11, the cylinder 102 is vented through the conduit 178, valve 150 and conduit 174, while pressure fluid is conveyed to cylinder 98 from the pressure fluid source 82 through valve 148 in its position 148a conduit 154, regulator valve 120, conduit 158, through valve 150, conduit 178c and conduit 176, the cylinder 106 remaining vented as previously.

In spite of the fact that the ratio regulators thus are indicating speed ratios $n_2/n_1$ above approximately 0.7, the reaction member now is brought to a stop by the brake 60 whereby the hydraulic blade system becomes working as a hydraulic turbulence brake at all vehicle speeds above a speed ratio of approximately 1.3, and as usually the engine idling speed is about $\frac{1}{7}$ of the engine maximum speed corresponding to the vehicle maximum speed, this means hydraulic braking down to about 15% of the vehicle maximum speed.

If still higher hydraulic braking effect is desired, such increased one can be obtained if valve 150 is put into the position 150d thereby the hydraulic braking effect remains down to a vehicle speed of about 5% of the vehicle maximum speed. In this case the cylinder 98 is vented through the conduit 176, valve 150, conduit 176c and the vent passage 172. Cylinder 102 is vented through conduit 178, valve 150 and vent passage 174, while pressure fluid is conveyed to the cylinder 106 from the pressure fluid source 82 through valve 148 in its position 148a, conduit 154, regulator valve 120, conduit 158, conduit 158a, valve 150, conduit 180a and conduit 180. Hereby the brake band 70 is engaged to keep the planet gear carrier 66 stationary and the converter is now functioning as a turbulence brake with a reaction member 26 rotating in reverse direction at a high speed.

As just mentioned FIG. 13 diagrammatically shows the efficiencies which are obtained as functions of the speed ratio $n_2/n_1$. When the reaction member is rotating in reverse or counter direction and the planet gear carrier 66 is kept stationary an efficiency according to curve $\eta_{DRR}$ is obtained. When the reaction member is kept stationary an efficiency according to curve $\eta_{SR}$ is obtained, and when the reaction member is rotating in the same direction and at a fixed speed ratio relative to the turbine member with mechanical power transmission from the turbine member to the reaction member at torque multiplication and from the reaction member to the turbine member at torque reduction an efficiency according to curve $\eta_{DRF}$ is obtained. Further, line $M_{1700}$ shows diagrammatically a typical input torque curve as function of the speed ratio $n_2/n_1$. As seen from the diagram the input torque curve has two branches one branch DRF corresponding to forward rotating reaction member and drawn as a continuous line and the other branch SR corresponding to stationary reaction member and drawn as a dashed line.

Up to a speed $n_2/n_1$ of 0.4–0.45 the reaction member is rotated in opposite direction to that of the turbine member for bringing about a high start multiplication of the torque and a high efficiency in the low ratio range of the working field. Above this value of the speed ratio there are two possibilities to drive the torque converter.

One of said possibilities is to hold the reaction member stationary corresponding to an efficiency curve having a maximum value of about 86% at a speed ratio of about 0.75 as shown in FIG. 13. The efficiency is decreasing to 80% at a speed ratio of about 0.95. The efficiency is then brought down to zero at a speed ratio of about 1.3. Above this speed ratio the converter will only cause a braking effect to the transmission. It is thus necessary for getting good efficiency at high vehicle speed to combine the converter with a direct clutch as is earlier known or to shift over the reaction member to rotate freely in the same direction as the turbine member which both result in driving possibilities up to speed ratio 1.0.

The other of said possibilities is to impose on the reaction member a condition causing it to rotate in the same direction as the turbine member at a fixed speed ratio. The efficiency curve corresponding to such a driving relation will lie under the efficiency curve corresponding to the driving relation with a stationary reaction member up to a speed ratio $n_2/n_1$ of about 0.65 corresponding to an efficiency of about 85%. Above this speed ratio the efficiency curve of a converter having a fixed ratio forward rotating reaction member will lie above the efficiency curve of a converter having a stationary reaction member and have a maximum value of about 90% at a speed ratio of about 0.85 as shown in FIG. 13. The efficiency is then decreasing to 80% at a speed ratio of about 1.1.

Owing to the rotation of the reaction member in the same direction as the turbine member at a fixed gear ratio, the reaction member above the coupling point, i.e. where a torque reduction takes place instead of a torque multiplication, will work as a second turbine member driven by the fluid and delivering power at a fixed speed ratio relative to the turbine member. This second turbine member influences the flow of the working fluid in every part of the hydraulic circuit in an extremely favourable way. Owing to this influence on the flow of the fluid, the torque absorption capacity of the impeller decreases as shown in FIG. 13 above a speed ratio of about 1.0, whereby the torque absorption curve branch DRF slopes more steeply than the corresponding efficiency curve $\eta_{DRF}$. Thus the torque absorption of the converter from the engine will decrease at increasing vehicle speed and the engine will increase its speed whereby the speed ratio of the converter will increase only slowly and so the efficiency of the converter will decrease slowly at increasing vehicle speed which is a very important difference between a torque converter having a forward rotating reaction member and a torque converter having a stationary reaction member. Owing to this relation a vehicle having a torque converter with a reaction member rotating forwardly at a fixed ratio can be driven to high maximum speeds with still high efficiency in the converter of about 80%. For this reason there is no fear that the efficiency will go down to zero neither at full power or at part power, whereby no braking will occur when the power output from the engine is decreased.

In consequence of the high hydraulic efficiency the difference between the primary input power and the secondary output power will be low and not higher than in normal minimum continuous drive. This difference in power appears in the form of heat which must be dissipated in order to hold the fluid of the converter at a constant temperature. The cooler, however, need not to be greater than its normal size owing to the continuous drive with counter rotating reaction member. For this reason the converter may easily be utilized for continuous drive also within the range of the speed ratio.

If, however, the converter is driven with the reaction member held stationary the cooling requirement will increase rapidly at increase of the speed ratio so that at a speed ratio of about 1.0 the cooling requirement will rise above the cooling requirement for continuous driving with counter rotating reaction member. The converter for that reason cannot be driven continuously at high speeds with the reaction member held stationary without an increase of the cooler for the working fluid up to a size corresponding to the maximum engine power for getting a guarantee against overheating at high speeds which also is a very important difference between torque converters having stationary and forward rotating reaction members.

From what is above said it is evident that the over drive function of the transmission will cause a broadening of the working field and counter balance the lower efficiency obtained in the hydraulic drive in relation to the direct drive by lower engine speed and thus higher engine efficiency. For that reason there is no need of a direct drive clutch in combination with a torque converter having a reaction member rotating in the same direction as the turbine member at a fixed gear ratio with mechanical power transmission therebetween, so that the transmission can be simplified as not only the clutch per se but also the control system for the clutch can be omitted.

The speed ratio 1.0 is the same as that which would be obtained by a direct clutch. At higher vehicle speeds the speed ratio will increase further and the transmission will for that reason work as an overdrive transmission. At a certain speed of the vehicle the engine speed for that reason will be lower and the engine efficiency higher than if the transmission had been replaced by a direct drive clutch. As a result of the decrease in the power absorption capacity the speed ratio will increase less rapidly at high velocity speeds and hardly increase above a certain value which in FIG. 13 is about 1.1.

With a converter having a stationary reaction member the speed ratio always will increase with the vehicle speed so that there is no certain value which will not be crossed. In reality there is not any possibility to use a converter having a stationary reaction member as an overdrive transmission because the efficiency at the speed ratio 1.0 is already only about 75% and decreases rapidly at increasing speed ratio. The cooling requirement is also high and already at the speed ratio 1.0 above the maximum cooling requirement of a converter having a forward rotating reaction member and about doubled at an increase to a speed ratio of 1.3, and the only guarantee against overheating at high speeds is to give the cooler a size corresponding to the maximum engine power.

Of course these curves only represent one embodiment of the invention. By a suitable choice especially of the gear ratio and the valve timing there are possibilities to increase the maximum speed ratio $n_2/n_1$ up to and above 1.20 for getting a greater over drive effect or to decrease the speed ratio down to about 1.0 if the over drive effect is not wanted. The curves for that reason only give an example of the invention and the invention is to be understood as embracing all forms of apparatus falling within the scope of the appended claims.

In FIGS. 2 and 3 the inflow conditions of the first turbine blades, of the reaction member blades, of the second turbine blades and of the pump blades under all the above described conditions or relations of drive are represented for different speed ratios. The inflow fields are represented with different kind of lines, viz. so that dashed lines corresponding to the double rotating range with the reaction member rotating in reverse or counter direction and at a planetary gear ratio of 1.8:1. The dash-dotted lines represent the inflow fields at single rotation with the reaction member locked. The double dot-dashed lines represent the inflow fields at the drive condition when the reaction member rotates forward at a gear ratio of 0.3:1 in the planetary gear and the continuous lines represent the condition at the same kind of drive but at a gear ratio of 0.5:1 in the planetary gear. It is evident that by means of varying of these factors a widening of the efficiency curve and change of the peak value of the efficiency thereby may be accomplished. From the position of these inflow condition fields it can be understood that a definite improvement in running conditions has been obtained at higher speed ratios when the reaction member, which is in power transmitting connection with the turbine member, is allowed to rotate in the same direction as the pump. The reason that a higher peak efficiency is obtained at this condition of drive than when the reaction member is standing still is explained by the fact that the ventilation losses between the reaction member and the turbine and between the turbine and the pump are considerably reduced. Furthermore the pump should be designed with a relatively large outlet angle which influences the inflow conditions of the first turbine blading. Furthermore the first turbine blading may advantageously be designed blunter than usual due to the fact that the influence of the speed of the reaction member on the inflow conditions to the first turbine blading is less than on the inflow conditions of the bladings of the reaction member and the second turbine blading.

The capacity of the apparatus to operate as a hydraulic torque converter up to and above the speed ratio 1:1 has been obtained by means of a combination of the forward rotating reaction member with the choice of a particular blade profile of the first turbine and the choice of a particular outlet angle of the pump. This combination results in reduced ventilation losses in the hydraulic system and a reduction in the inflow losses particularly to the bladings of the reaction member and the second turbine within the high speed range together with reduced inflow losses to the first turbine in the high speed range depending partly on the influence of the forward rotating turbine, partly on the influence of the particularly chosen profile for the first turbine, and partly on the influence of the particularly chosen outlet angle of the pump.

In FIGS. 14 and 15 a reverse drive device directly connected with the transmission is shown.

The planet carrier 66 additionally carries a series of studs 67 upon which are rotatably mounted satellite gears 69, each meshing with one of the planet gears 64.

The planets 64, in addition to engaging the teeth of the sun gear 62, also mesh with the internal teeth of the ring gear 72, the latter also being provided with internal splines engaging external splines on the disc like hub 36a of the shaft 36 of the turbine member, the ring gear 72 thus in effect constituting a part of the turbine member.

The driven or output member 48 has a disc-like hub portion 48a provided with axially extending external splines 71 located to engage internal splines 73 on a selector member in the form of a sleeve 75 slidably mounted on the part 48a but rotationally fixed thereto by engagement of the splines 71 and 73. The selector member is provided with a circumferentially extending groove 79 for the reception of a shift fork to shift the member axially on the splines of the part 48a, and at its left hand end (as viewed in FIG. 14) the sleeve 75 is additionally provided with internal teeth 81 located to mesh with the satellite gears 69 when the sleeve 75 is shifted to its left hand end position.

Additionally, the ring gear 72 is provided with external splines 83 of gear tooth form located to be engaged by the internal teeth 81 on the sleeve 75 when the sleeve is shifted to the right of the position shown in FIG. 14.

As will be apparent from the drawings, the arrangement provides mechanism whereby, by axial shifting of the sleeve 75, either forward or reverse drive between the driven member of the converter and the output member 48 of the transmission can be effected at will, as well as a neutral position, as viewed in FIG. 14 in which position power transmitting drive cannot be delivered from the turbine member of the converter to the output member of the transmission.

Satellite gears 69 obviously rotate about their axes in a direction the reverse of that of the direction of rotation of the planet gears 64 about their axes. Consequently, when sleeve 75 is shifted to the left from the position shown in FIG. 14 so that the internal teeth 81 engage the satellite gears 69, rotation in reverse direction is imparted to the output member 48 as compared with the direction of rotation of the ring gear 72 rotating with and forming part of the turbine or driven member of the converter when the planet carrier 66 is held stationary.

In the position of the sleeve 75 shown in FIG. 14, no driving force can be transmitted from the portion 36a of the turbine member to the portion 48a of the output member 48, and consequently a neutral position is established in which no power can be transmitted to the drive line of the vehicle or other power utilizing apparatus.

If the sleeve is shifted to the right of the position shown in FIG. 14 then the internal teeth 81 on sleeve 75 engage the external spline teeth on the ring gear 72. Since sleeve 75 is rotationally fixed by means of the splines 71, 73 to the output member 48, the output member 48 of the transmission is connected to rotate in the same direction as that of the turbine member of the converter. In other words, a forward drive position is established when the sleeve 75 is shifted to the right from the position shown in FIG. 14 to bring teeth 81 and 83 into mesh.

From the foregoing, it will be evident that by virtue of the sliding sleeve arrangement embodying the sleeve 75, it is possible to utilize the gearing which is essential for the types of hydraulic drive to which the invention is related, to additionally effect without additional separate reverse gearing between the transmission and the drive line of the vehicle, either forward or reverse drive or a neutral position.

In order to achieve this desirable result, all that is necessary in addition to the gearing which otherwise would be required for the converter alone is the satellite gears 69 and their bearings which are carried by the planet carrier 66, and the sliding sleeve 75 adapted to be shifted to connect the driven or output member of the converter wither directly with the ring gear of the second planetary gear train (which is a component of the turbine member of the converter) or with the satellite gears carried by the planet carrier of that gear train.

Reference has previously been made to the brake mechanism 60, 56 and 70 for releasably braking the drum part 58 of the planet carrier 50 the ring gear 54 of the first planetary gear train and the planet carrier 66 of the second planetary gear train.

In FIG. 15 a suitable arrangement is shown for releasing of braking any one of the above parts as desired, and by way of illustration but without limitation, there is shown in FIG. 15 a mechanism for effecting such releasable braking of one of such parts.

Referring now more particularly to FIG. 15, the drum portion 68 of the planet carrier 66 is shown by way of example, on the opposite side of which are shown the brake shoes 95 and 97 pivotally mounted respectively of the arms 99 and 101, which in turn are pivotally mounted on the fixed pivots 103, 105, respectively.

The lower ends of levers 99 and 101 are adapted to be engaged by suitable abutments, one of which is located to engage the lever 99 and is formed as a part of the actuating rod 107 connected to piston 109 in hydraulic cylinder 111. The lower end of the other lever 101 is located to be engaged by the abutment provided by the annular piston rod 113 around the rod 107 and connected with piston 115, also located in cylinder 111.

Through the spring 117 levers 99 and 101 can be separated to release the brake shoes or hydraulic fluid can be admitted to the space between the pistons in the cylinder to bring the pistons apart and apply the brake shoes.

It will be understood that similar releasable braking arrangements are provided for braking the drum part 58 of the planet carrier 50 and for releasably braking the ring gear 54 of the first planetary gear train.

As previously noted, it is desirable to provide a positive parking or locked position in which the power output member of the transmission, which is connected to the drive line of the vehicle or other apparatus driven through the transmission, is positively held against rotation. This is accomplished in accordance with one phase of the present invention by movement of the selector sleeve member 75 to an extreme right hand end position in which the teeth 81 on the sleeve pass through and to the right of the teeth 83 into the clearance space on the right of the latter teeth, to thereby permit the internal spline teeth 73 on the sleeve member to mesh with the spline teeth 10a formed as a part of the stationary housing structure 10. With the selector in this position, it will be evident that the power output member 48 will be positively locked against rotation by the action of the spline teeth 73 simultaneously engaging the spline teeth 71 and the stationary spline teeth 10a. The teeth 83 may be attended to the right so far that teeth 81 and 83 are in mesh simultaneously as 73 and 10a.

In FIG. 17 a different specific embodiment of gearing is illustrated, which embodiment provides the novel features of construction and operation previously described in connection with FIG. 14, but which differs therefrom in that it provides a different ratio of relative speed between the reaction and turbine members under certain conditions of hydraulic drive.

Referring to FIG. 17, the parts corresponding to those shown in FIG. 14 have been designated by like numerals, and it is to be assumed that the gearing illustrated in FIG. 17 is to be connected to a torque converter of the type illustrated in FIG. 14.

In the present construction the turbine shaft member 36 has rotationally fixed to it the sun gear 44 of the first planetary gear train, the sun gear meshing with planets 52 carried by the planet carrier 50 rotationally fixed to the reaction member 42 of the converter. Planets 52 mesh with ring gear 54 adapted to be rotationally braked by the brake mechanism 56. The planet carrier 50 has a brake portion 58 adapted to be braked by the brake mechanism 60.

The planet carrier 66 of the second planetary gear train is adapted to be releasably braked by the brake mechanism 70 and carries pins providing planet axes 65 upon which the planets 64 are rotatably mounted. The planet carrier 66 also carries satellite gears 69 having teeth meshing with the teeth of the planets 64.

The output member 48 is provided with splines 71 on which there is slidably mounted the selector member in the form of the sleeve 75a provided with a circumferential external flange 79a for the reception of a suitable shift fork and also provided with external teeth 81a adapted to mesh with the teeth of the satellite gears 69 when the sleeve 75a is shifted to the left from the neutral position shown in FIG. 17.

In the present embodiment the shaft 36 of the turbine member is provided with an extension 36a provided with splines located to be engaged by the splines 117 on the sleeve member 75a, so that when sleeve 75a is moved to the right from the position shown in FIG. 17, a direct forward driving connection will be established between the turbine shaft member 36 and the power output member 48.

As will be apparent from the drawing, sleeve 75a can be moved further to the right than the position in which splines 117 engage splines on the turbine shaft part 36a and when it is so moved from that position, then splines 75b on the sleeve 75a may be brought into engagement with the splines 10b on the stationary housing 10, thus positively locking the power output member 48 against rotation and with the selector member in such position that no torque can be transmitted from the converter through the selector member to the power output member 48.

It will thus be seen that with the present arrangement a positive neutral is provided, with the parts shown in FIG. 17, a reverse connection through the satellite gears can be provided, a forward connection can be provided or, additionally, a positive parking or locked position can be provided.

Insofar as the gearing is concerned, the difference between the gearing in the present embodiment and that of FIG. 14 is that in the present instance the plant carrier 50 of the first planetary gear train has an extension, on the side of the planets opposite the brake drum part 58, which provides a ring gear 62a for the second planetary gear train rather than the sun gear which is formed on this planet carrier in the embodiment of FIG. 14. Further, instead of the ring gear part 72 which forms a part of the turbine member in the construction of FIG. 14, the turbine member in the present embodiment has rotationally fixed thereto a sun gear 72a which meshed with the planets 64 of the second planetary gear train.

As will be evident by comparison of FIGS. 14 and 17, in the arrangement shown in FIG. 14, when the planet carrier 66 of the planetary gear train is held rotationally stationary, the sun gear 62 of the second planetary gear train is rotated at a speed higher than that of the turbine member. Thus a certain relative speed between the speeds of rotation of the turbine and reaction members is established which is dependent upon the relative pitch diameters of the sun gear 62 and the ring gear 72. In the construction shown in FIG. 17, under the same condition, with the planet carrier 66 held rotationally stationary the ring gear 62a of the second planetary gear train rotates at a speed lower than that of the turbine member. Obviously, with this arrangement a different ratio of relative speeds of the turbine and reaction members of the converter will be obtained, as compared with the speed relation obtained with the arrangement shown in FIG. 14, exact ratio in the present instance, as well as in the case of the construction shown in FIG. 14, being determined by the relation of the pitch diameter of the sun and ring gears to meet different stall torque ratio demands.

It is to be noted that in order to combine in a single gear assembly, both the necessary gear relations for either establishing the desired types of hydraulic drive and the gear relations necessary to provide forward and reverse drives to a power output member, as well as a positive neutral and a positive parking position, a novel form of planet carrier is employed, which, in addition to carrying the pivots which provide the axes about which the planets rotate, also carries a separate set of pivot members providing axes about which satellite gears, meshing with the planets, rotate. This planetary carrier with its planets and satellite gears cooperates with the part providing the ring gear of the second planetary gear train and also with the selector member for obtaining both forward and reverse drive to the power output member. In order for this to be able to function properly, it is necessary not only that the satellite gears be mounted so as to mesh with the planets, but that they also must be mounted on a radius from the axis of rotation of the planet carrier so related to the relative diameters of the planets and satellite gears that the satellite gears are free to the engaged by the appropriate teeth on the selector member without interference from the adjacent planets.

The manner in which this is accomplished is best illustrated in FIG. 15 wherein it will be seen that the arrangement is such that the external circumscribing circle 69a of the satellites is of substantially larger diameter than the external circumscribing circle 64a of the planets thus providing the necessary radial clearance to permit the selector member to assume positions such as that shown in FIG. 14 and positions to the right of that shown in FIG. 14, without the internal teeth 81 of that member contacting the teeth of the planets 64 or even the ring gear part 72, while at the same time being located to mesh with the teeth of the satellites 69 when the selector member is moved to the left of the position shown in FIG. 14.

Also, in the arrangement shown in FIG. 17, it is desirable, from the standpoint of meeting the special gear ratio obtained with this design, to so locate the satellite gears 69 that the diameter of the inscribed circle internally of the gears is less than the diameter of the inscribed circle internally of the planets 64.

It is evident that if the reverse gear is connected and instead of the brakeband 70 the brakeband 60 is applied to keep the sun gear 62 stationary, the planet carrier 66 will rotate forward together with the ring gear 72 which is fixed to the turbine. When doing so the satellites 69 are driven by the planet gears and driving the sleeve 75 in the reverse direction relative to the planet carrier 66, however, at a lower speed relative to the planet carrier than the movement of the planet carrier itself, whereby a forward movement of the sleeve 75 and the output power or propeller shaft 48 is obtained. This forward movement is, however, for ordinary gear ratios less than ⅓ of the speed of the turbine whereby corresponding torque multiplication is obtained.

As reverse drive of the propeller shaft 48 is obtained when the brakeband 70 is applied and the sleeve 75 connects the satellites 69 with the propeller shaft, and forward drive is obtained when brakeband 60 is applied while the sleeve 75 still connects satellites 69 with propeller shaft 48, then it is obvious that a shift between forward and reverse drive can be obtained by shifting between the actuating of the brakebands 60 and 70. Obviously, a very high torque will be obtained on the output shaft with the brake 60 applied and sleeve 75 connecting the satellites 69 with the propeller shaft 48 as the gear ratio of about 3:1 is obtained in the planet gear system and at stalling the turbine will have about four times as high torque as the input torque to the transmission. Thus a torque multiplication of about 12:1 will be obtained, being even about 50% higher than such obtained in double rotation drive.

The conditions referred to are elucidated by means of the diagrams shown in FIG. 18. The lines a, b and c show diagrammatically tractive effort obtained with reverse rotating reaction member, with stationary reaction member and with forward rotating reaction member, respectively, when the turbine and propeller shafts are directly connected and brakes 70, 60 and 56 respectively are applied. Line d shows the tractive effort obtainable if the propeller shaft 48 is connected to the satellites 69 by means of the sleeve 75 at the same time as the brake 60 is applied. The peak speed will in this case be less than ⅓ of the normal but tractive effort at stalling about 50% higher than obtainable with the ordinary setting. Line e shows the tractive effort which is obtained if a stationary reaction member should be used over the whole range.

For the purpose to more clearly show the combinations which are possible with the mechanical and hydraulic arrangement shown these possibilities are assemblied with the following table.

tive speed ratio less than 1:1 and means for anchoring said element against rotation in either direction regardless of the direction of power transmission through the gearing.

4. A hydrodynamic torque converter for transmitting power from a power source to a power output member providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising portions in which the flow of the working liquid is generally radially inward or generally radially outward, connected by curved portions, a pump

|  |  | Brake 60 | Brake 56 | Brake 70 | Selector sleeve in connection with— |  |  |  |
|---|---|---|---|---|---|---|---|---|
|  |  |  |  |  | Turbine and output shaft | Only output shaft | Satellite wheels and output shaft | Output shaft and stationary casing |
| Forward | N | Free | Free | Free |  | X |  |  |
|  | DRB | Free | Free | Fixed | X |  |  |  |
|  | SR | Fixed | Free | Free | X |  |  |  |
|  | DRF | Free | Fixed | Free | X |  |  |  |
| Backward | DRB | Free | Free | Fixed |  |  | X |  |
| Emergency gear | SR | Fixed | Free | Free |  |  | X |  |
| Parking brake |  | Free | Free | Free |  |  |  | X |

N denotes the output shaft disconnected.
DRB denotes the turbine system operating with reverse rotating, power transmitting reaction member.
SR denotes still standing reaction member.
DRF denotes co-rotating, power transmitting reaction member.

From the foregoing it will be apparent that the principles of the present invention may be embodied and advantageously carried into effect in various different specific embodiments of apparatus, and the invention is accordingly to be understood as embracing all forms of apparatus falling within the scope of the appended claims.

I claim:
1. A hydrodynamic torque converter having a closed hydraulic circuit, rotatively mounted pump, reaction and turbine members having blades located in said circuit, a rotationally stationary structure, gearing interconnecting said reaction and said turbine members to provide a connection for positive transmission of power from either one of said members to the other, said gearing including an element in the path of power transmission which when rotationally stationary imposes on said reaction and turbine members rotation in the same direction at a fixed relative speed ratio and means for anchoring said element to the rotationally stationary structure against rotation in either direction regardless of the direction of power transmission through the gearing.

2. A hydrodynamic torque converter having a closed hydraulic circuit, rotatively mounted pump, reaction and turbine members having blades located in said circuit, a rotationally stationary structure, gearing interconnecting said reaction and said turbine members for positive power transmission at least from the reaction member to the turbine member, said gearing comprising an element in the path of power transmission which when rotationally stationary causes the reaction member to rotate in the same direction as and at a speed fixed relative to that of the turbine member, and means for anchoring said element to the rotationally stationary structure against rotation at least in the same direction as that of the pump member.

3. A hydrodynamic torque converter having a closed hydraulic circuit, rotatively mounted pump, reaction and turbine members having blades located in said circuit, a rotationally stationary structure, gearing interconnecting said reaction and said turbine members to provide a connection for positive transmission of power from either one of said members to the other, said gearing including an element in the path of power transmission which when rotationally stationary imposes on said reaction and turbine members rotation in the same direction at a fixed relamember having one ring of blades located in said circuit, a turbine member directly connected to said power output member and having two rings of blades located in said circuit, a reaction member having one ring of blades located in said circuit, the blades of said reaction member being located in and confined to the portion of the circuit in which the flow of the working liquid is generally radially inward, the arrangement of the several blade rings being such that the flow of the working liquid discharged from the pump blades is directed to the first ring of turbine blades, from which the liquid is discharged directly to the reaction blades, and from the reaction blades to the second ring of turbine blades, the discharge from said turbine blades being delivered to the pump blades, a rotationally stationary structure, gearing interconnecting said reaction and said turbine members for positive power transmission therebetween, said gearing comprising an element in the path of power transmission which when rotationally stationary causes the reaction member to rotate in the same direction as and at a speed fixed relative to that of the turbine member, and means for anchoring said element to the stationary structure against rotation at least in the same direction as that of the pump member.

5. A transmission for transmitting power in the same direction in different torque transmitting relationships from a power source to a power output member comprising hydrodynamic torque converter providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising portions in which the flow of the working liquid is generally radially inward or generally radially outward, connected by curved portions, a pump member having one ring of blades located in said circuit, a turbine member having two rings of blades located in said circuit, a reaction member having one ring of blades located in said circuit, the blades of said reaction member being located in the portion of the circuit in which the flow of the working liquid is generally radially inward, the arrangement of the several blade rings being such that the flow of the working liquid discharged from the pump blades is directed to the first ring of turbine blades, from which the liquid is discharged directly to the reaction blades, and from the reaction blades to the second ring of turbine blades, the discharge from said turbine blades being delivered to the pump blades, a rotationally stationary structure, gearing interconnecting said reaction and said turbine members for positive power transmission therebetween, said gearing comprising two different elements in the path of power transmission the first one of which when rotationally stationary causes the reaction member to rotate in the same direction as and at a speed fixed relative to that of the turbine member, and the second one of which when rotationally stationary holds the reaction member stationary and a control system including means for selectively anchoring said first one of said elements to said stationary structure against rotation in either direction to effect power transmission from said source to said output member in one torque transmitting relationship and anchoring said second one of said elements to said stationary structure against rotation in either direction to effect power transmission from said source to said output member in a different torque transmitting relationship.

6. A transmission for transmitting power in the same direction in different torque transmitting relationships from a power source to a power output member comprising hydrodynamic torque converter providing a toroidal chamber for working liquid defined by an outer wall and an inner wall, the inner wall being provided by annular core structure spaced from the outer wall, said toroidal working chamber providing a closed circuit for circulation of the working liquid and said circuit comprising portions in which the flow of the working liquid is generally radially inward or generally radially outward, connected by curved portions, a pump member having one ring of blades located in said circuit, a turbine member having two rings of blades located in said circuit, a reaction member having one ring of blades located in said circuit, the blades of said reaction member being located in the portion of the circuit in which the flow of the working liquid is generally radially inward, the arrangement of the several blade rings being such that the flow of the working liquid discharged from the pump blades is directed to the first ring of turbine blades, from which the liquid is discharged directly to the reaction blades, and from the reaction blades to the second ring of turbine blades, the discharge from said turbine blades being delivered to the pump blades, a rotationally stationary structure, gearing interconnecting said reaction and said turbine members for positive power transmission therebetween, said gearing comprising two different elements in the path of power transmission the first one of which when rotationally stationary causes the reaction member to rotate in the same direction as and at a speed fixed relative to that of the turbine member and the second one of which when rotationally stationary causes the reaction member to rotate in the opposite direction to that of the turbine member, and a control system including means for selectively anchoring said first one of said elements to said stationary structure against rotation in either direction to effect power transmission from said source to said output member in one torque transmitting relationship and anchoring said second one of said elements to said stationary structure against rotation in either direction to effect power transmission in the same direction from said said source to said output member in a different torque transmitting relationship.

7. A transmission for transmitting power in the same direction in different torque transmitting relationships from a power source to a power output member comprising hydrodynamic torque converter providing a toroidal chamber for working liquid defined by an outer wall and an inner wall, the inner wall being provided by an annular core structure spaced from the outer wall, said toroidal working chamber providing a closed circuit for circulation of the working liquid and said circuit comprising portions in which the flow of the working liquid is generally radially inward or generally radially outward, connected by curved portions, a pump member having one ring of blades located in said circuit, a turbine member having two rings of blades located in said circuit, a reaction member having one ring of blades located in said circuit, the blades of said reaction member being located in the portion of the circuit in which the flow of the working liquid is generally radially inward, the arrangement of the several blade rings being such that the flow of the working liquid discharged from the pump blades is directed to the first ring of turbine blades, from which the liquid is discharge directly to the reaction blades, and from the reaction blades to the second ring of turbine blades, the discharge from said turbine blades being delivered to the pump blades, a rotationally stationary structure, gearing interconnecting said reaction and said turbine members for positive power transmission therebetween, said gearing comprising three different elements in the path of power transmission the first one of which when rotationally stationary causes the reaction member to rotate in the same direction as and at a speed fixed relative to that of the turbine member, the second one of which when rotationally stationary holds the reaction member rotationally stationary and the third one of which when rotationally stationary causes the reaction member to rotate in the direction opposite to that of the turbine member, and a control system including means for selectively inchoring said first one of said elements to the stationary structure against rotation in either direction to effect power transmission from said source to said output member in one torque transmitting relationship, anchoring a second one of said elements to said stationary structure against rotation in either direction to effect power transmission in the same direction from said source to said output member in a different torque transmitting relationship and anchoring said third one of said elements to said stationary structure against rotation in either direction to effect power transmission in the same direction to said output member in a third and different torque transmitting relationship.

8. A hydrodynamic torque converter having a closed hydraulic circuit, rotatively mounted pump, reaction and turbine members having blades located in said circuit, a rotationally stationary structure, gearing interconnecting said reaction and said turbine members for positive power transmission therebetween, said gearing comprising two different elements in the path of power transmission, the first one of which when rotationally stationary causes the reaction member to rotate in the same direction as and at a speed fixed relative to that of the turbine member, and the second one of which when rotationally stationary holds the reaction member rotationally stationary, means for selectively anchoring each of said elements to the stationary structure against rotation in either direction, and a control system responsive to a predetermined speed ratio between the turbine and pump members for changing the anchoring of said elments, whereby the first element is anchored at speed ratios above said predetermined speed ratio, and the second element is anchored at speed ratios below said predetermined speed ratio.

9. A hydrodynamic torque converter having a closed hydraulic circuit, rotatively mounted pump, reaction and turbine members having blades located in said circuit, a rotationally stationary structure, gearing interconnecting said reaction and said turbine members for positive power transmission therebetween, said gearing comprising two different elements in the path of power transmission the first one of which when rotationally stationary causes the reaction member to rotate in the same direction as and at a speed fixed relative to that of the turbine member, the second one of which when rotationally stationary causes the reaction member to rotate in the opposite direction to that of the turbine member, means for selectively anchoring each of said elements to the stationary structure against rotation in either direction, and a control system responsive to a predetermined speed ratio between the turbine and pump members for changing the anchoring of said elements, whereby the first element is anchored at speed ratios above said predetermined speed ratio and the second element is anchored at speed ratios below said predetermined speed ratio.

10. A hydrodynamic torque converter having a closed hydraulic circuit, rotatively mounted pump, reaction and turbine members having blades located in said circuit, a rotationally stationary structure, gearing interconnecting said reaction and said turbine members for positive power transmission therebetween, said gearing comprising three different elements in the path of power transmission, the first one of which when rotationally stationary causes the reaction member to rotate in the same direction as and at a speed fixed relative to that of the turbine member, the second one of which when rotationally stationary holds the reaction member rotationally stationary, and the third one of which when rotationally stationary causes the reaction member to rotate in the opposite direction to that of the turbine member, means for selectively anchoring each of said elements to the stationary structure against rotation in either direction, and a control system responsive to two different predetermined speed ratios between the turbine and pump members for changing the anchoring of said elements, whereby the first element is anchored at speed ratios above the higher of said predetermined speed ratios, the second element is anchored at speed ratios between said predetermined speed ratios, and the third element is anchored at speed ratios below the less of said predetermined speed ratios.

11. A hydrodynamic torque converter having a closed hydraulic circuit, rotatively mounted pump, reaction and turbine members having blades located in said circuit, a rotationally stationary structure, gearing interconnecting the reaction and turbine members and comprising two different planetary gearings, the first one of said planetary gearings being provided with a planet carrier with a set of planets and fixed to the reaction member, with a sun gear cooperating with said planets and fixed to the turbine member, and with a ring gear cooperating with the planets, the second one of said planetary gearings being provided with a sun gear fixed to the reaction member, with a ring gear fixed to the turbine member, and with a planet carrier with a set of planets cooperating with the sun gear as well as with the ring gear and means for selectively anchoring said ring gear of said first planetary gearing and said planet carrier of said second planetary gearing to the rotationally stationary structure against rotation in either direction independently of each other, whereby with said ring gear of said first planetary gearing anchored the reaction member is caused to rotate in the same direction as and at a speed fixed relative to that of the turbine member and with said planet carrier of said second planetary gearing anchored the reaction member is caused to rotate in the opposite direction to that of the turbine member.

12. A hydrodynamic torque converter having a closed hydraulic circuit, rotatively mounted pump, reaction and turbine members having blades located in said circuit, a rotationally stationary structure, gearing interconnecting said reaction and said turbine members and comprising two different planetary gearings, the first one of said planetary gearings being provided with a planet carrier with a set of planets and fixed to the reaction member, with a sun gear cooperating with said planets and fixed to the turbine member, and with a ring gear cooperating with the planets, the second one of said planetary gearings being provided with a sun gear fixed to the reaction member, with a ring gear fixed to the turbine member, and with a planet carrier with a set of planets cooperating with the sun gear as well as with the ring gear, and means for selectively anchoring said ring gear of said first planetary gearing, said planet carrier of said first planetary gearing and said planet carrier of said second planetary gearing to the rotationally stationary structure against rotation in either direction independently of each other, whereby with said ring gear of said first planetary gearing anchored the reaction member is caused to rotate in the same direction as and at a speed fixed relative to that of the turbine member, with said planet carrier of said first planetary gearing anchored the reaction member is held rotationally stationary, and with said planet carrier of said second planetary gearing anchored the reaction member is caused to rotate in the opposite direction to that of the turbine member.

13. In a power transmission power from a power input member to a power output member and including a hydrodynamic torque converter having rotatably mounted reaction and turbine members, a gearing for power transmission between said reaction and turbine members in certain driving relations to provide types of hydraulic drive through the converter, said gearing including a planetary gear train comprising a sun gear, a ring gear, a rotatably mounted planet carrier, releasable brake means for selectively holding said planet carrier against rotation, planets rotatably mounted on said planet carrier and meshing with said sun gear and said ring gear, one of the gears of said gear train being fixed to rotate with said turbine member and the other of said gears of said gear train being fixed to rotate with said reaction member, a plurality of satellite gears rotatably mounted on said planet carrier and each meshing with one of said planets and a selector member for transmitting power from the turbine member of the converter to the power output member of the transmission or alternatively for transmitting power from the satellite gears to the power output member of the transmission in either direction.

14. A power transmission as defined in claim 13, in which the gear of said planetary gear train rotating with said reaction member is provided with brake means for selectively holding said gear and said reaction member against rotation in order when said selector member transmits power between said satellite gears and said power output member to cause rotation of said power output member in same direction as that of said turbine member at high gear ratio.

15. A power transmission as defined in claim 13, in which said selector member is longitudinally shiftable from a first position in which it is engaged by said satellite gears to provide reverse rotation between said turbine member and said power output member to a second position in which it engages a part of the turbine member and the power output member.

16. A power transmission as defined in claim 15, in which said selector member is movable to a third position intermediate said first and second positions, wherein the power transmitting connection through said selector member from said turbine member or said satellite gears to said output member is broken, whereby to establish a positive non-power transmitting relation between said turbine and said power output members.

17. A power transmission as defined in claim 16, in which said transmission includes a rotationally stationary housing structure and in which said selector member is movable to a fourth position in which the selector member is operatively disconnected from at least said satellite gears and is rotationally fixed with respect to said stationary housing, whereby to provide a positive mechanical lock against rotation of the drive line to which said power output member is connected.

18. A power transmission as defined in claim 13, in which said selector member is in the form of a sleeve slidably mounted and rotationally fixed on said power output member.

19. A power transmission as defined in claim 15, in which said satellite gears are mounted so that the external circumscribing circle thereof is of greater diameter than the external circumscribing circle of said planets and said selector member is provided with internal teeth located to mesh with the teeth of said satellite gears at the external circumscribing diameter thereof.

20. A power transmission as defined in claim 15, in which the sun gear of said planetary gear train is fixed to rotate with the reaction member of the converter and the ring gear of the planetary train is fixed to rotate with the turbine member of the converter.

21. A power transmission as defined in claim 18, in which said selector sleeve externally encircles the ring gear of the planetary gear train and is provided with internal splines for slidably engaging the power output member and with internal teeth which in one position of the selector engage the teeth of said satellite gears and in another position of the selector sleeve engage teeth formed on the ring gear of said planetary gear train.

22. A power transmission as defined in claim 18, in which the selector member comprises a sleeve having internal splines engaging said power output member and external teeth which are located to mesh with the teeth of said satellite gears in one position of the selector member.

23. A power transmission as defined in claim 15, in which said satellite gears are mounted so that the internal inscribing circle of the gears is of lesser diameter than the internal inscribing circle of said planets and said selector sleeve is provided with external teeth located to mesh with the teeth of said satellite gears at the inner diameter thereof.

24. A power transmission as defined in claim 23, in which the sun gear of said planetary gear train is fixed to rotate with the turbine member of the converter and in which the ring gear is fixed to rotate with the reaction member of the converter.

25. A power transmission as defined in claim 23, in which said selector member is additionally provided with internal teeth located to mesh with external teeth on the turbine member of the converter in another position of said selector member.

26. A power transmission comprising a hydrodynamic torque converter having rotatably mounted reaction and turbine members and a rotatably mounted power output member capable of rotating in either direction, gearing interconnecting said reaction and turbine members to selectively provide different power transmitting relations between said reaction and said turbine members said gearing including at least one set of planets rotatably mounted on a planet carrier and a plurality of satellite gears rotatably mounted on said planet carrier and each meshing with one of said planets and a selector member engaging said power output member to rotate therewith and shiftable to different positions, said selector member including a gear positioned to alternatively engage said satellite gears or said turbine member in different ones of its different positions, whereby to transmit drive from the turbine member of the converter to said power output member to selectively effect either forward or reverse rotation of said power output member relatively to the direction of rotation of the turbine member of the converter.

27. A power transmission as defined in claim 26, in which means are provided for causing reverse rotation of said power output member by holding said planet carrier stationary when said selector member connects said satellite gears with said power output member.

28. A power transmission as defined in claim 26, in which means are provided for obtaining high torque multiplication by holding said reaction member stationary and by permitting said planet carrier to rotate while transmitting power through said planet and satellite gears via said selector member to said power output member rotating in forward direction.

29. In a power transmission of the kind described, including a hydraulic torque converter having rotatably mounted pump, reaction and turbine members, a rotationally stationary housing structure, a rotatably mounted power output member, a gearing interconnecting said reaction and turbine members to selectively provide different power transmitting relations between said reaction and turbine members, said gearing including at least one set of planets rotatably mounted on a planet carrier and a plurality of satellite gears rotatably mounted on said planet carrier and each meshing with one of said planets, a selector member engaging said power output member to rotate therewith and shiftable to different positions, said selector member including a gear positioned to alternatively engage said satellite gears or said turbine member in different ones of its different positions, whereby to transmit drive from the turbine member of the converter to said power output member, said gearing having a plurality of elements interconnective with said stationary structure, and an automatically operable control system responsive to different predetermined speed ratios between the speeds of the turbine and the pump members of the converter for selectively causing different ones of said elements to be anchored to said stationary structure.

30. A power transmission as defined in claim 29, in which the primary side of said automatically operable control system is driven from said pump member and the secondary side of said automatically operable control system is driven from said turbine member of the converter.

31. A power transmission of the kind described, including a hydraulic torque converter having rotatably mounted pump, reaction and turbine members, a rotationally stationary housing structure, a rotatable mounted power output member, a gearing interconnecting said reaction and turbine members to selectively provide different power transmitting relations between said reaction and turbine members, said gearing including at least one set of planets rotatably mounted on a planet carrier and a plurality of satellite gears rotatably mounted on said planet carrier and each meshing with one of said planets, a selector member engaging said power output member to rotate therewith and shiftable to different positions, said selector member including a gear positioned to alternatively engage said satellite gears or said turbine member in different ones of its different positions, whereby to transmit drive from the turbine member of the converter to said power output member, said gearing having a plurality of elements interconnective with said stationary structure, and an automatically operable control system responsive to different predetermined speed ratios between the speed of the turbine and the pump members of the transmission for selectively causing different ones of said elements to be anchored to said stationary structure.

32. A power transmission as defined in claim 31, in which the primary side of said automatically operable control system is driven from said pump member and the secondary side of said automatically operable control system is driven from said power output member of the transmission.

33. A hydrodynamic torque converter having a closed hydraulic circuit, rotatively mounted pump, reaction and turbine members having blades located in said circuit, a rotationally stationary structure, gearing interconnecting said reaction and said turbine members to provide a connection for positive transmission of power between said members, said gearing including a first element in the path of power transmission which when rotationally stationary imposes rotation on said reaction and turbine members at a first fixed relative speed ratio at which the speed of rotation of said reaction member is higher than that of said turbine member and a second element in the path of power transmission which when rotationally stationary imposes rotation on said reaction and turbine members at a second fixed relative speed ratio, and separate first and second anchoring means for anchoring said elements in alternation to the rotationally stationary structure against rotation in the direction imposed by the power transmitted between said reaction and turbine members.

34. A transmission for transmitting power in the same direction in different torque transmitting relationships from a power source to a power output member comprising a hydrodynamic torque converter having a closed hydraulic circuit, rotatively mounted pump, reaction and turbine members having blades located in said circuit, a rotationally stationary structure, gearing interconnecting said reaction and said turbine members for positive power transmission therebetween, said gearing comprising two different elements in the path of power transmission the first one of which when rotationally stationary causes the reaction member to rotate in the same direction as and at a speed fixed relative to that of the turbine member, and the second one of which when rotationally stationary holds the reaction member rotationally stationary, and a control system including means for selectively anchoring said first one of said elements to the stationary structure to effect power transmission from said source to said output member in one torque transmitting relationship and anchoring said second one of said elements to said stationary structure to effect power transmission in the same direction from said source to said output member in a different torque transmitting relationship.

35. A power transmission for transmitting power in the same direction in different torque transmitting relationships from a power source to a power output member comprising a hydrodynamic torque converter having a closed hydraulic circuit, rotatively mounted pump reaction and turbine members having blades located in said circuit, a rotationally stationary structure, gearing interconnecting said reaction and said turbine members for positive power transmission therebetween, said gearing comprising two different elements in the path of power transmission the first one of which when rotationally stationary causes the reaction member to rotate in the same direction as and at a speed fixed relative to that of the turbine member, and the second one of which when rotationally stationary holds the reaction member rotationally stationary, means for anchoring said first element against rotation at least in the same direction as that of the pump member, means for anchoring said second element against rotation at least in the direction opposite to that of the pump member, and a control system including means for selectively actuating said anchoring means to anchor said first one of said elements to the stationary structure to effect power transmission from said source to said output member in one torque transmitting relationship and to anchor said second one of said elements to said stationary structure to effect power transmission in the same direction from said source to said output member in a different torque transmitting relationship.

36. A transmission for transmitting power in the same direction in different torque transmitting relationships from a power source to a power output member comprising a hydrodynamic torque converter having a closed hydraulic circuit, rotatively mounted pump, reaction and turbine member having blades located in said circuit, a rotationally stationary structure, gearing interconnecting said reaction and said turbine members for positive power transmission therebetween, said gearing comprising two different elements in the path of power transmission, the first one of which when rotationally stationary causes the reaction member to rotate in the same direction as and at a speed fixed relative to that of the turbine member, and the second one of which when rotationally stationary causes the reaction member to rotate in the direction opposite to that of the turbine member, and a control system including means for selectively anchoring said one of said elements to said stationary structure against rotation in either direction to effect power transmission from said source to said output member in one torque transmitting relationship and anchoring said second one of said elements to said stationary structure against rotation in either direction to effect power transmission in the same direction from said source to said output member in a different torque transmitting relationship.

37. A transmission for transmitting power in the same direction in different torque transmitting relations from a power source to a power output member comprising a hydrodynamic torque converter having a closed hydraulic circuit rotatively mounted pump, reaction and turbine members having blades located in said circuit, a rotationally stationary structure, gearing interconnecting said reaction and said turbine members for positive power transmission therebetween, said gearing comprising three different elements in the path of power transmission the first one of which when rotationally stationary causes the reaction member to rotate in the same direction as and at a speed fixed relative to that of the turbine member, the second one of which when rotationally stationary holds the reaction member rotationally stationary and the third one of which when rotationally stationary causes the reaction member to rotate in the direction opposite to that of the turbine member, and a control system including means for selectively anchoring said first one of said elements to said stationary structure against rotation in either direction to effect power transmisison from said source to said output member in a first torque transmitting relationship, anchoring said second one of said elements to said stationary structure against rotation in either direction to effect power transmission in the same direction from said source to said power output element in a second and different torque transmitting relationship and anchoring said third one of said elements to said stationary structure against rotation in either direction to effect power transmission in the same direction from said source to said output element in a third and different torque transmitting relationship.

38. A transmission for transmitting power in the same direction in different torque transmitting relationships from a power source to a power output member comprising a hydrodynamic torque converter having a closed hydraulic circuit, rotatively mounted pump, reaction and turbine members having blades located in said circuit, a rotationally stationary structure, gearing interconnecting said reaction and said turbine members for positive power transmission therebetween, said gearing comprising three different elements in the path of power transmission the first one of which when rotationally stationary causes the reaction member to rotate in the same direction as and at a speed fixed relative to that of the turbine member, the second one of which when rotationally stationary holds the reaction member rotationally stationary, and the third one of which when rotationally stationary causes the reaction member to rotate in the direction opposite to that of the turbine member, means for anchoring said first one of said element to said stationary structure against rotation at least in the same direction as that of the pump member, means for anchoring said second and said third elements to said stationary structure against rotation at least in the direction opposite to that of the pump member, and a control system including means for selectively actuating said anchoring means to anchor said first one of said elements to effect power transmission from said source to said output member in a first torque transmitting relationship, to anchor said second one of said element to effect power transmission in the same direction from said source to said output member in a second and different torque transmitting relationship and to anchor said third one of said element to effect power transmission in the same direction from said source to said output member in a third and different torque transmitting relationship.

39. A hydrodynamic torque converter having a closed hydraulic circuit, rotatively mounted pump, reaction and turbine members having blades located in said circuit, a rotationally stationary structure, planetary gearing interconnecting said reaction and said turbine members to provide a connection for positive transmission of power between said members, said gearing including a first element in the path of power transmission which when rotationally stationary imposes rotation on said reaction and turbine members at a first fixed relative speed ratio and a second element in the path of power transmission which when rotationally stationary imposes rotation on said reaction and turbine members at a second fixed relative speed ratio, and separate first and second anchoring means for anchoring said elements in alternation to the rotationally stationary structure against rotation in the direction imposed by the power transmitted between said reaction and turbine members, said planetary gearing comprising a sun gear connected to said reaction member, a ring gear connected to said turbine member, and a planet carrier carrying planets meshing with said sun and ring gears, said planet carrier constituting said first element adapted to be anchored by said first anchoring means.

40. A converter as defined in claim 39 in which said gearing imposes a speed of rotation on said reaction member higher than that of said turbine member when said first element is anchored and imposes a speed of rotation on said reaction member lower than that of said turbine member when said second element is anchored.

41. A converter as defined in claim 40 including regulating means responsive to the ratio of the speed of the turbine member relative to that of the pump member for selectively effecting engagement of said first anchoring means when said ratio is below a preselected value and effecting engagement of said second anchoring means when said ratio is above a preselected value.

References Cited by the Examiner
UNITED STATES PATENTS

| | | | |
|---|---|---|---|
| 2,324,713 | 7/43 | McFarland | 74—677 |
| 2,707,539 | 5/55 | Marble | 74—731 X |
| 2,745,295 | 5/56 | Burnett | 74—677 |
| 2,762,238 | 9/56 | Baker | 74—677 |
| 2,786,365 | 3/57 | Lammerz | 74—677 |
| 2,833,162 | 5/58 | Forster. | |
| 2,851,906 | 9/58 | De Lorean | 74—677 |
| 2,896,468 | 7/59 | Cheek et al. | |
| 2,905,025 | 9/59 | Karlsson et al. | 74—677 |
| 3,005,359 | 10/61 | Ahlen | 74—677 |
| 3,073,181 | 1/63 | Kronogard | 74—677 |

DON A. WAITE, *Primary Examiner.*
BROUGHTON G. DURHAM, *Examiner.*